(12) United States Patent
Kumai

(10) Patent No.: US 8,619,215 B2
(45) Date of Patent: Dec. 31, 2013

(54) OPTICAL ELEMENT, METHOD FOR MANUFACTURING THE SAME, LIQUID CRYSTAL DEVICE, AND ELECTRONIC APPARATUS

(75) Inventor: Yoshitomo Kumai, Okaya (JP)

(73) Assignee: Seiko Epson Corporation (JP)

( * ) Notice: Subject to any disclaimer, the term of this patent is extended or adjusted under 35 U.S.C. 154(b) by 561 days.

(21) Appl. No.: 12/271,170

(22) Filed: Nov. 14, 2008

(65) Prior Publication Data
US 2009/0135355 A1 May 28, 2009

(30) Foreign Application Priority Data

Nov. 28, 2007 (JP) ................................. 2007-307607

(51) Int. Cl.
*G02F 1/1335* (2006.01)
*G02B 5/30* (2006.01)

(52) U.S. Cl.
USPC ....................................... 349/96; 359/485.05

(58) Field of Classification Search
USPC .......... 359/486, 489, 486.01–486.03, 487.03; 349/96
See application file for complete search history.

(56) References Cited

U.S. PATENT DOCUMENTS

| | | | | |
|---|---|---|---|---|
| 5,742,433 | A | * | 4/1998 | Shiono et al. ................. 359/575 |
| 6,122,103 | A | * | 9/2000 | Perkins et al. ........... 359/485.03 |
| 2005/0088739 | A1 | * | 4/2005 | Chiu et al. .................... 359/486 |
| 2008/0186576 | A1 | * | 8/2008 | Takada .......................... 359/492 |
| 2008/0266662 | A1 | * | 10/2008 | Perkins ........................ 359/486 |
| 2008/0309853 | A1 | * | 12/2008 | Ge et al. ........................ 349/96 |

FOREIGN PATENT DOCUMENTS

| | | |
|---|---|---|
| JP | 2002-520677 | 7/2002 |
| JP | 2006-133275 | 5/2006 |
| WO | 00-004418 | 1/2000 |

* cited by examiner

*Primary Examiner* — Jessica M Merlin
(74) *Attorney, Agent, or Firm* — Harness, Dickey & Pierce, P.L.C.

(57) ABSTRACT

An optical element includes: a substrate having a plurality of first regions and a plurality of second regions that are partitioned in plan view; a first grid one-dimensionally formed in the plurality of first regions on the substrate; a diffraction function portion including a plurality of grooves parallel to each other in the plurality of second regions on the substrate; and a second grid formed in a region excluding the plurality of grooves on the diffraction function portion. The optical element reflects a part of incident light and transmits a part of the incident light.

16 Claims, 20 Drawing Sheets

OPTICAL ELEMENT, METHOD FOR MANUFACTURING THE SAME, LIQUID CRYSTAL DEVICE, AND ELECTRONIC APPARATUS

BACKGROUND

1. Technical Field

The present invention relates to an optical element and a method for manufacturing the same, a liquid crystal device, and an electronic apparatus.

2. Related Art

A wire grid polarization element (hereinafter, simply referred to as "polarization element" in some cases) is known as one of optical elements having a polarization separation function. The element has a number of conductive micro-wires arranged at a pitch smaller than the wavelength of light. The element also has a property of reflecting a light component (TE) having a polarization axis parallel to the micro-wires and transmitting a light component (TM) having a polarization axis perpendicular to the micro-wires among light components of incident light.

When such a wire grid polarization element is built in a transflective liquid crystal device, a wire grid and a scattering layer are layered in an area corresponding to a reflective display region in one pixel region. The surface of the wire grid has ridges and valleys to reflect and scatter light for achieving favorable display characteristics in a reflective display. This is because that the wire grid having a flat surface shows extremely high luminance in a specular direction only. This results in lowering the luminance in a viewing direction, making it difficult to see images. Refer to JP-T-2002-520677.

Such a wire grid described above is formed on an inside surface of a resin layer. The inside surface corresponding to a reflective display region has ridges and valleys. The wire grid is formed by the following manner. First, as shown in FIGS. 22A and 22B, a metal film 512 having a light reflection property such as aluminum is formed on a concave-convex surface 511A of a resin film 511 by a vacuum film forming process. The metal film 512 is formed with a thickness of about 0.1 μm and its surface has ridges and valleys (concave-convex shape) tracing the surface shape of the resin film 511. A pitch P between convex portions 512a is about 10 μm.

Then, a resist film 513 having photosensitivity is formed on the metal film 512 showing such a concave-convex shape. The resist film 513 is subjected to two-beam interference exposure and development so as to form a resist pattern. The metal film 512 is dry-etched with the resist pattern. Accordingly, a great number of micro-wires are formed, thereby providing the wire grid.

Here, as shown in FIG. 22A, a height H of asperity of a concave-convex surface 512A of the metal film 512 is about 1 μm. When a resist is applied to the concave-convex surface 512A by spin coating, as shown in FIG. 23, most of the resist collects inside a concave portion 512b while the resist is hardly applied on the convex portion 512a. As a result, the resist film 513 cannot be formed with a uniform thickness. In this case, an exposure amount with respect to the resist film 513 differs from place by place (the convex portion 512a and the concave portion 512b), thereby not providing a resist pattern having a uniform shape. That is, even if the resist film 513 shown in FIG. 23 is exposed, a desired resist pattern cannot be formed on the convex portion 512a because the resist film 513 has not been applied on the convex portion 512a, as shown in FIG. 24.

FIG. 25 shows the metal film 512 having been etched by using the resist pattern shown in FIG. 24 as a mask. As can be seen from FIG. 25, the metal film 512 on a concave portion 511b of the resin film 511 is favorably etched whereas the metal film 512 on a convex portion 511a is mostly removed, thereby exposing the concave-convex surface 511A of the resin film 511. Therefore, it is obviously difficult to form a wire grid on the concave-convex surface 511A of the resin film 511 due to the problems in processes as described above.

This structure also has a problem from a point of view of the performance of a liquid crystal device. As shown in FIGS. 22A and 22B, the height H of the asperity of the resin film 511 (metal film 512) is about 1 μm. This concave-convex shape causes variations in the thickness of a liquid crystal layer. Typically, the liquid crystal layer is designed with a thickness of about 5 μm. Thus, the thickness of the liquid crystal layer varies by about 20 percent in a plane. This variation causes deterioration in contrast of images.

A conceivable structure is shown in FIGS. 26A, 26B, and 27. FIG. 27 is a sectional view of FIGS. 26A and 26B. As shown in FIG. 26A, a diffraction function layer 614 is disposed on a substrate 6. The diffraction function layer 614 is a structure having a larger period than a wavelength of visible light. On the surface of the diffraction function layer 614, a grid 615 as shown in FIG. 26B is disposed. This structure can reduce a height g (difference in height) of a step 616 of the diffraction function layer 614 to about 0.1 μm as shown in FIG. 27. That is, the height of about 1 μm in related art can be successfully reduced to about one tenth. This reduction drastically reduces the thickness variation caused in resist application when the grid 615 is formed. As a result, a resist pattern having a uniform thickness can be achieved. In addition, the thickness variation of a liquid crystal layer can also be reduced, preventing a contrast from lowering.

The conceivable structure described above can drastically reduce the surface step (difference in height of the step 616) of the diffraction function layer 614 on which the grid 615 is formed as compared to the structure in related art. However, in forming the grid 615, a forming defect of the grid 615 may occur because a resist pattern R is incompletely formed in the vicinity of the step 616.

FIG. 28 shows a resist that is spin-coated on the diffraction function layer 614 (difference in height of the step 616 is about 0.1 μm). Then, a resist film 617, which is the resist formed in the above, is subjected to two-beam interference exposure, providing a resist pattern shown in FIG. 29.

FIG. 29 is a sectional view showing a part of the resist film in FIG. 28 after the exposure. In FIG. 29, the resist pattern R seems to be formed roughly on an entire surface of the diffraction function layer 614. However, some portions in the vicinity of the step 616 may not be completely fixed due to lack of an exposure amount at the bottom of the resist film 617.

It is conceivable that this occurs because of an intensity distribution in a plane produced by a phase modulation of exposure light due to a shape of steps on the resist surface. Since the conceivable structure can drastically reduce the difference in height as compared to the one in related art, it is favorable as long as the resist is flatly applied so as to fill in the difference in height when the resist is applied. However, if the resist surface has the difference in height, portions that are not completely fixed will occur.

SUMMARY

An advantage of the invention is to provide an optical element having a wire grid easily manufactured and superior optical characteristics, a liquid crystal device and an electronic apparatus achieving high functions of the liquid crystal device and simple manufacturing processes.

An optical element according to a first aspect of the invention includes: a substrate including a plurality of first regions and a plurality of second regions that are partitioned in plan view; a first grid one-dimensionally formed in the plurality of first regions on the substrate; a diffraction function portion including a plurality of grooves parallel to each other in the plurality of second regions on the substrate; and a second grid formed in a region excluding the plurality of grooves on the diffraction function portion. The optical element reflects a part of incident light and transmits a part of the incident light.

This structure can produce difference in refractive index between the first regions and the second regions, while producing difference in refractive index between the plurality of grooves in the second regions, providing a high diffusion effect of the reflected light with respect to a wavelength of the incident light. Further, the diffusion effect of the reflected light can be adjusted by adjusting the depth of the grooves with respect to the grids.

Further, the plurality of grooves preferably penetrates through the diffraction function portion to reach the substrate in a thickness direction of the diffraction function portion.

This can make the difference in refractive index between the first regions and the second regions large.

A method for manufacturing an optical element according to a second aspect of the invention includes: a) one-dimensionally forming a first grid in a plurality of first regions on a substrate including the plurality of first regions and a plurality of second regions that are partitioned in plan view; b) forming a diffraction function material layer on the substrate; c) forming a second grid on the diffraction function material layer in the plurality of second regions; and d) reducing a thickness of the diffraction function material layer so as to expose a surface of the substrate in the first regions.

In this case, the first grid is formed on the substrate having a flat surface without any level differences, while the second grid is formed on the diffraction function material layer also having a flat surface without any level differences, thereby improving uniformity of an exposure amount of a resist during a manufacturing process of each grid. In a case of related art, ridges and valleys generated on a surface of a resist cause incomplete exposure of the resist. However, in the invention, the first grid and the second grid that have different heights from the substrate surface are formed in separate steps so as to make the surface of the resist flat, thereby preventing such incomplete exposure. As a result, a desired resist pattern is formed, thus securely providing the micro-wires (the first grid and the second grid) having a favorable optical characteristic (polarization separation characteristic).

Further, in this case, the diffraction function material layer in the first regions and the second regions, that is, a whole of the diffraction function material layer is subjected to etching. Therefore, the diffraction function material layer in the first regions is removed so as to expose the first grid, while a region corresponding to spaces between the micro-wires is partially removed so as to form grooves. Consequently, the diffraction function portion is achieved.

A method for manufacturing an optical element according to a third aspect of the invention includes: e) forming a first grid including a plurality of micro-wires in a plurality of first regions on a substrate including the plurality of first regions and a plurality of second regions that are partitioned in plan view; f) forming a diffraction function material layer so as to cover the first grid; g) reducing a thickness of the diffraction function material layer in the plurality of second regions; h) forming a second grid including a plurality of micro-wires on the diffraction function material layer in the second regions; and i) etching the diffraction function material layer in the first regions and the second regions so as to expose the first grid.

In this case, the first grid is formed on the substrate having a flat surface without any level differences, while the second grid is formed on the diffraction function material layer also having a flat surface without any level differences, thereby improving uniformity of an exposure amount of a resist during a manufacturing process of each grid. In a case of related art, ridges and valleys generated on a surface of a resist cause incomplete exposure of the resist film. However, in the invention, the first grid and the second grid that have different heights from the substrate surface are formed in separate steps so as to make the surface of the resist flat, thereby preventing such incomplete exposure. As a result, a desired resist pattern is formed, thus securely providing the micro-wires (the first grid and the second grid) having a favorable optical characteristic (polarization separation characteristic).

In this case, the diffraction function material layer in the first regions and the second regions, that is, a whole of the diffraction function material layer is subjected to etching. Therefore, the diffraction function material layer in the first regions is removed so as to expose the first grid, while a region corresponding to spaces between the micro-wires is partially removed so as to form grooves.

In addition, in step g) according to the method, a diffusion effect of the reflected light with respect to a wavelength of the incident light can be adjusted by adjusting the depth of the grooves.

Further, the diffraction function material layer, the first grid, and the second grid are preferably made of materials each having an etching rate different from each other.

In this case, the diffraction function material layer can be accurately etched.

Further, the methods, a base layer to be a base of the first grid and the second grid is preferably formed immediately before at least one of steps a) and c) or at least one of steps e) and h).

The base layer is formed as necessary and can improve adhesion strength of each grid and the diffraction function portion, or each grid and the substrate by being formed therebetween.

Furthermore, in the methods, steps a), c), e), and h) preferably include: forming a metal film and an antireflection film so as to be layered; and patterning the metal film and the antireflection film in a grid-like pattern.

In steps a), c), e), and h), the metal film and the resist film are layered and a latent image of the micro-wires is patterned on the resist film by exposure. In this case, since the antireflection film is formed under the resist film, laser light can avoid being reflected by the metal film, thus preventing incomplete exposure. Accordingly, desired micro-wires are securely and accurately formed.

According to a fourth aspect of the invention, a liquid crystal device includes the optical element.

In this case, a liquid crystal device equipped with the optical element having a superior light scattering function can be provided.

In addition, it is preferable that the liquid crystal device further include a liquid crystal layer between a pair of substrates, and the optical element be formed at a side of at least one of the pair of substrates, the side being adjacent to the liquid crystal layer.

In this case, a liquid crystal device having a built-in reflection polarization layer can be provided.

Further, it is preferable that the liquid crystal device be a transflective type liquid crystal device capable of providing both a transmissive display and a reflective display in a single pixel, and include the optical element as a reflection layer for the reflective display.

In this case, a transflective liquid crystal device that can achieve a high contrast display in both the transmissive display and the reflective display can be provided.

According to a fifth aspect of the invention, an electronic apparatus includes the liquid crystal device described above.

In this case, an electronic apparatus equipped with a display part or an optical modulation unit having high display quality and reliability can be provided.

According to a sixth aspect of the invention, an electronic apparatus includes the optical element described above.

In this case, an electronic apparatus including a polarizing optical system that is superior in optical characteristics and reliability is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
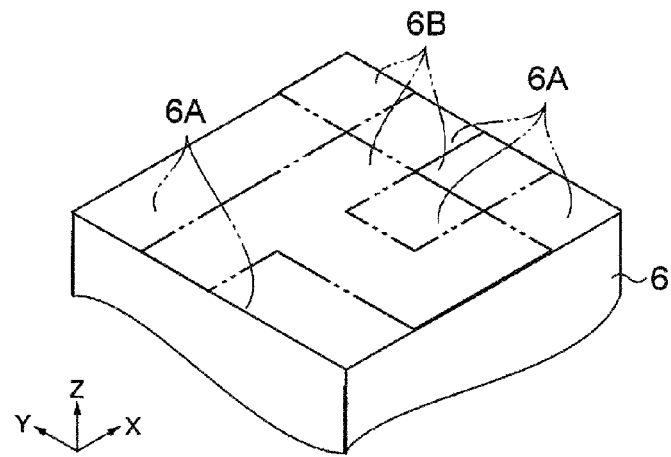
FIG. 1A is a perspective view showing a substrate of an optical element according to a first embodiment.

Embodiments of the invention will be described below with reference to the drawings. Note that scales of members in the drawings referred to hereinafter are adequately changed so that they can be recognized.

Optical Element of First Embodiment

Figure 1B:
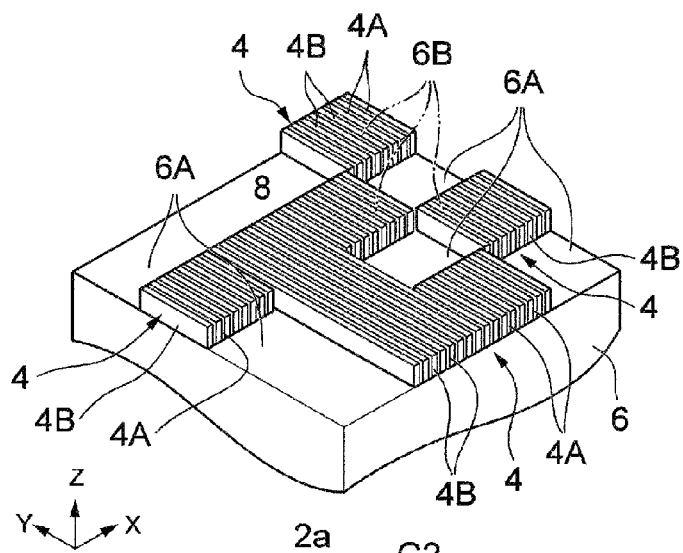
FIG. 1B is a perspective view showing a shape of a diffraction function portion.
Figure 1C:
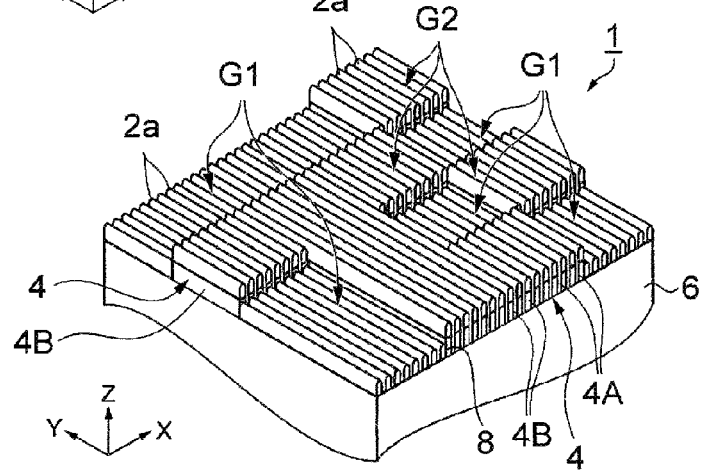
FIG. 1C is a perspective view showing a grid formed on the diffraction function portion shown in FIG. 1B.
Figure 2A:
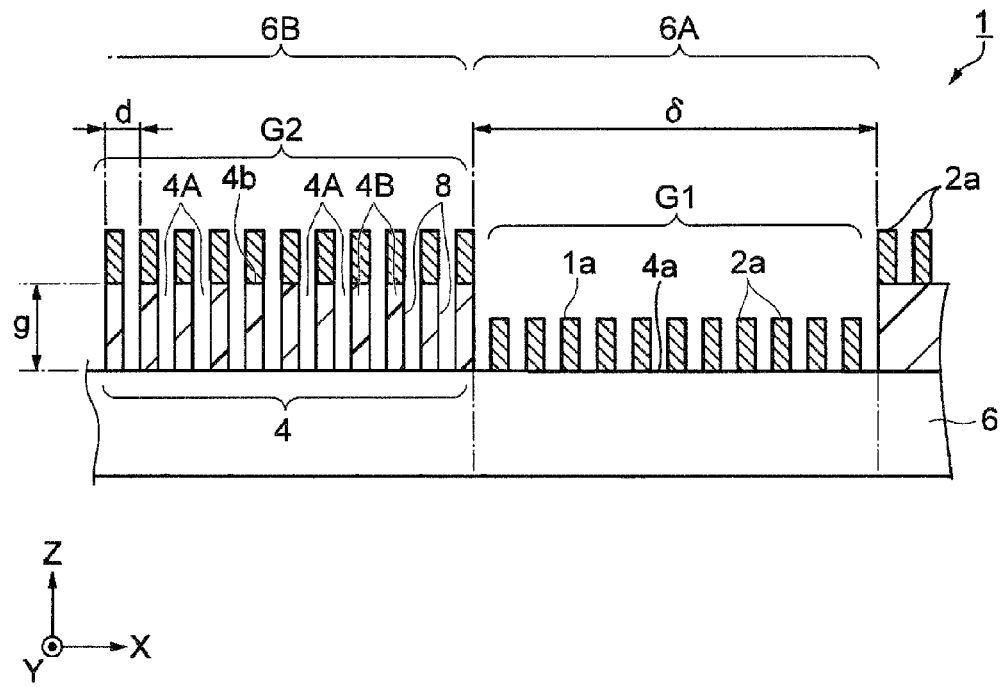
FIG. 2A is a sectional view of the optical element taken along an X-Z plane in FIG. 1A.
Figure 2B:
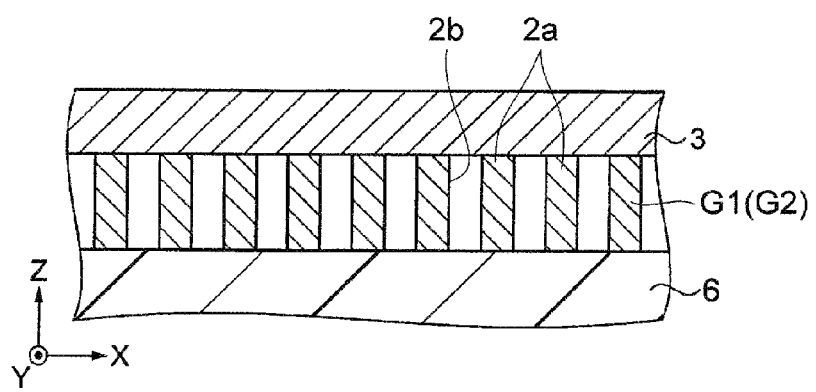
FIG. 2B is a partially enlarged sectional view of the optical element.

FIG. 1A is a perspective view showing partition regions (a first region and a second region) of a substrate. FIG. 1B is a perspective view showing a shape of a diffraction function portion. FIG. 1C is a perspective view showing grids formed on the diffraction function portion shown in FIG. 1B. FIG. 2A is a sectional view of the optical element taken along an X-Z plane in FIG. 1C. FIG. 2B is a partially enlarged sectional view of an optical element 1. In FIGS. 1A through 1C, in reality, the same structures are continuously and more extensively formed than the X-Y plane.

The optical element 1 according to the embodiment includes, as shown in FIGS. 1A through 2B, a substrate 6 made of glass or the like, a plurality of diffraction function portions 4, a plurality of first grids G1, and a plurality of second grids G2. The diffraction function portions 4 and the first grids G1 are arranged on the substrate 6 in plan view, and further the second grids G2 are arranged on the diffraction function portions 4.

As shown in FIG. 1A, the substrate 6 is made of a material having transparency such as glass, and has a plurality of first regions 6A and a plurality of second regions 6B that are partitioned in plan view. The first regions 6A and the second regions 6B are arranged randomly (irregularly). These areas are in a square shape or an irregular combination of such squares in a vertical or lateral direction. Here, the smallest size (that is, a length of one side of the above-described square) δ (FIG. 2A) of the first regions 6A and the second regions 6B is larger than a wavelength λ of incident light. If visible light is used, the size δ may be set to, e.g., 2 μm.

In the first regions 6A of the substrate 6, the first grids G1 formed from a great number of micro-wires 2a that are parallel to each other are respectively disposed. The micro-wires 2a are made of aluminum and disposed in parallel with one of the straight lines of outer periphery of the first regions 6A. A disposition pitch d of the micro-wires 2a is smaller than the wavelength λ of incident light and may be set to 140 nm, for example. Note that the number of the micro-wires 2a smaller than that of actual micro-wires is shown in FIG. 1A for expository convenience.

In the second regions 6B of the substrate 6, the diffraction function portions 4 and the second grids G2 are formed so as to be layered sequentially from a substrate surface. The diffraction function portions 4 include a plurality of grooves 4A that are parallel to one of the straight lines of the outer periphery of the second regions 6B. Protruded threads 4B forming the grooves 4A are disposed on both sides of the grooves 4A and higher than the first grids G1. Thus, upper surfaces 4b of the protruded threads 4B are further than upper surfaces 1a of the micro-wires 2a of the first grids G1 from the substrate surface. Each of the upper surfaces 4b of the protruded threads 4B is parallel to the substrate surface and has a width in a shorter direction that is equal to a width of the micro-wires 2a. Further, a disposition pitch of the grooves 4A (protruded threads 4B) is equal to a pitch of the micro-wires 2a of the first grids G1, which is 140 nm, for example.

At borders of the grooves 4A and the protruded threads 4B in the diffraction function portions 4 as above, step parts 8 are formed. The height g of the step parts 8 is set to be smaller than the wavelength of incident light. Further, the step parts 8 are nearly perpendicular to the substrate surface.

The second grids G2 are formed on the diffraction function portions 4 from a great number of micro-wires 2a that are parallel to each other, similarly to the first grids G1 described above. The great number of micro-wires 2a are respectively formed on the protruded threads 4B of the diffraction function portions 4. The second grids G2 and the first grids G1 are made to have different heights from the substrate surface.

As shown in FIG. 2B, the first grids G1 and the second grids G2 are sealed by a sealing layer 3 made of $SiO_2$, SiN, or the like. The space enclosed by the protruded threads 4B, the micro-wires 2a, and the sealing layer 3 is under vacuum.

Under the first grids G1 and the second grids G2, a base layer (not illustrated) made of a material different from any of the materials of the substrate 6, the diffraction function portions 4, and the grids G1 and G2 may be formed. In this case, adhesion strength between the substrate 6 and the base layer, and adhesion strength between the first grids G1 and the base layer are preferably higher than that between the substrate 6 and the first grids G1. Further, adhesion strength between the diffraction function portions 4 and the base layer, and adhesion strength between the second grids G2 and the base layer are preferably higher than that between the diffraction function portions 4 and the second grids G2. In such a structure, interposition of the base layer can improve adhesiveness between the substrate 6 and the first grids G1, and adhesiveness between the diffraction function portions 4 and the second grids G2. As a material of the base layer, for example, a dielectric thin film made of $SiO_2$ or the like may be used.

Figure 3A:
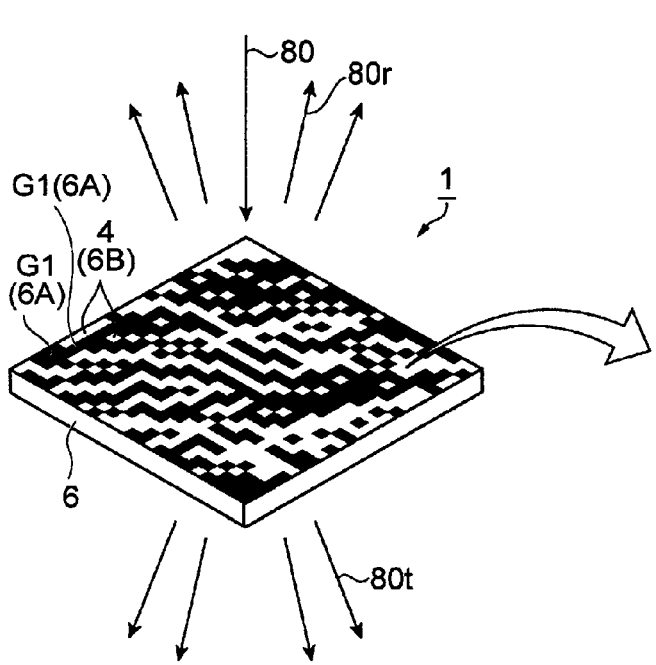
FIG. 3A is a diagram showing a function of the diffraction function portion.
Figure 3B:
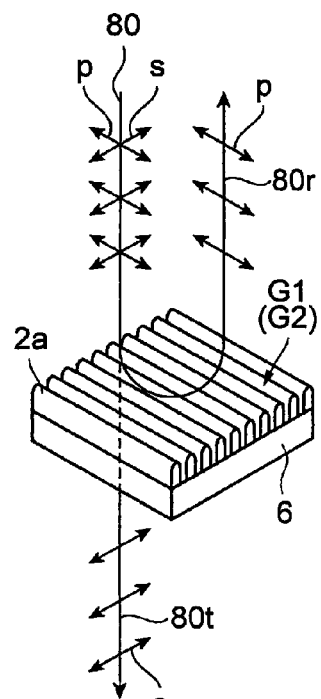
FIG. 3B is a diagram showing a function of grids G1 and G2.

FIGS. 3A, and 3B are schematic views for explaining functions of the optical element 1. FIG. 3A is a diagram showing a function of the diffraction function portions 4, while FIG. 3B is a diagram showing a function of the grids G1 and G2.

As shown in FIG. 3B, among light components of incident light 80 entering into the grids G1 (G2), light components p having a polarization axis parallel to the micro-wires are reflected by the grids G1 (G2) and light components s having a polarization axis perpendicular to the micro-wires are transmitted by the grids G1 (G2). That is, the optical element 1 having the grids G1 and G2 has a polarization-separation function, and separates the incident light 80 into reflected light 80r and transmitted light 80t that are in different polarization states.

In the optical element 1 shown in FIG. 3A, black areas correspond to the first regions 6A and white areas correspond to the second regions 6B. On the substrate 6, the plurality of first grids G1 is distributed in each of the first regions 6A, while the plurality of diffraction function portions 4 is distributed in each of the second regions 6B (refer to FIG. 1B). The diffraction function portions 4 diffract the incident light 80 according to distribution of concaves and convexes formed by the grooves 4A and the protruded threads 4B so as to diffuse the incident light 80 in a direction different from the incident direction as shown in FIG. 3A. More specifically, the diffraction function portions 4 can act so that both reflected light 80r reflected by the grids G1 (G2) and the transmitted light 80t transmitted by the grids G1 (G2) are diffused. Further, diffusion characteristics of the reflected light 80r and the transmitted light 80t can be controlled as described later.

The diffusion effects of the reflected light 80r and the transmitted light 80t shown in FIG. 3A can be controlled by changing a height g of the step parts 8 of the diffraction function portions 4. In a case where the incident light 80 nearly perpendicularly enters into the diffraction function portions 4, a height gr of the step parts 8 to provide an utmost diffusion effect of the reflected light 80r is obtained from a formula (1) below.

$$gr = (2m+1)\lambda/4n \quad (1)$$

where m is an integer that is 0 or more, λ is a wavelength of the incident light 80, and n is a refractive index of a surrounding medium of the optical element 1. On the other hand, a height gt of the step parts 8 to provide an utmost diffusion effect of the transmitted light 80r is obtained from a formula (2) below.

$$gt = (2m+1)\lambda/2(N-1) \quad (2)$$

where N is a refractive index of the diffraction function portions 4.

According to the formulae (1) and (2), it is found that the height gr of the step parts 8 to provide the utmost diffusion effect of the reflected light 80r and the height gt of the step parts 8 to provide the utmost diffusion effect of the transmitted light 80t are different from each other. Therefore, the height of the step parts 8 of the diffraction function portions 4 is set to be equal to the height gr, suppressing the diffusion effect of the transmitted light 80t.

For example, in a case of λ=600 nm, gr is 100 nm when m equals 0 (zero) according to the formula (1), while gt is 600 nm according to the formula (2), when n=1.5 and N=1.5. Here, if the height g of the step parts 8 is set to be 100 nm (depth gr), the utmost diffusion effect of the reflected light 80r by the diffraction function portions 4 can be obtained. In this case, the height g is different from the height gt (600 nm) that provides the utmost diffusion effect of the transmitted light 80t, thereby preventing the diffusion effect of the transmitted light 80t from increasing. Therefore, this can separate the incident light 80 into the reflected light 80r and the transmitted light 80t that have different polarization states from each other while widely diffusing the reflected light 80r, and suppressing diffusion of the transmitted light 80t.

When an intermediate value of the height gt that may be obtained from the formula (2) is gt', gt' satisfies a following formula (3).

$$gt' = (m+1)\lambda/(N-1) \qquad (3)$$

Therefore, the height g of the step parts 8 of the diffraction function portions 4 is set to gt' above, minimizing the diffusion effect of the transmitted light 80t. That is, the height g of the step parts 8 to be set to gt' above also can separate the incident light 80 into the reflected light 80r and the transmitted light 80t that have different polarization states from each other, while diffusing the reflected light 80r, and suppressing diffusion of the transmitted light 80t.

When the optical element 1 is applied to a specific display device, the first regions 6A and the second regions 6B of the substrate 6 may be completely randomly disposed overall. However, alternatively, a unit pattern in which the first regions 6A and the second regions 6B are disposed in a specific random distribution may be made and the unit pattern may be repeatedly disposed in a plurality of numbers. The unit pattern may be in any size, and thus, for example, may be a square having a side of 400 μm. According to such a structure, a photomask used for manufacturing the diffraction function portions 4 can also employ a structure in which a mask pattern corresponding to the above-described unit pattern is repeatedly disposed, allowing the photomask to be easily made. As a result, the optical element 1 is easily manufactured.

Figure 4:
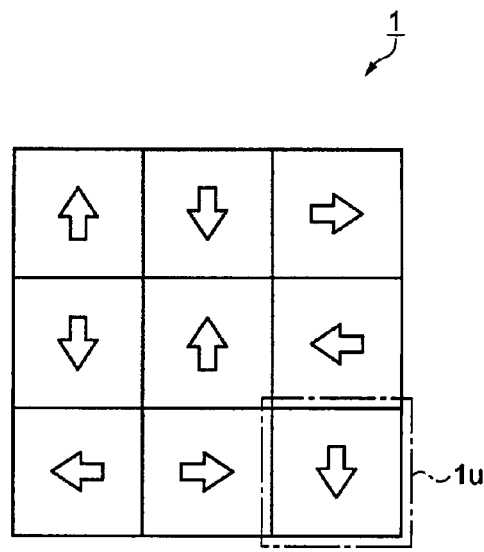
FIG. 4 is a diagram showing an example of arranging unit patterns in the optical element.

Further, as shown in FIG. 4, unit patterns 1u may be disposed so as to be adjacent and in directions different from each other. In FIG. 4, an arrow in each unit pattern 1u indicates the direction of the unit pattern 1u. Such arrangement can lower periodicity of the diffraction function portions 4. As a result, bias of the diffusion direction due to a repetition cycle of the unit pattern 1u can be dissolved. Also, coloring due to the diffraction can be reduced to an extent not causing a problem for practical use.

Figure 5:
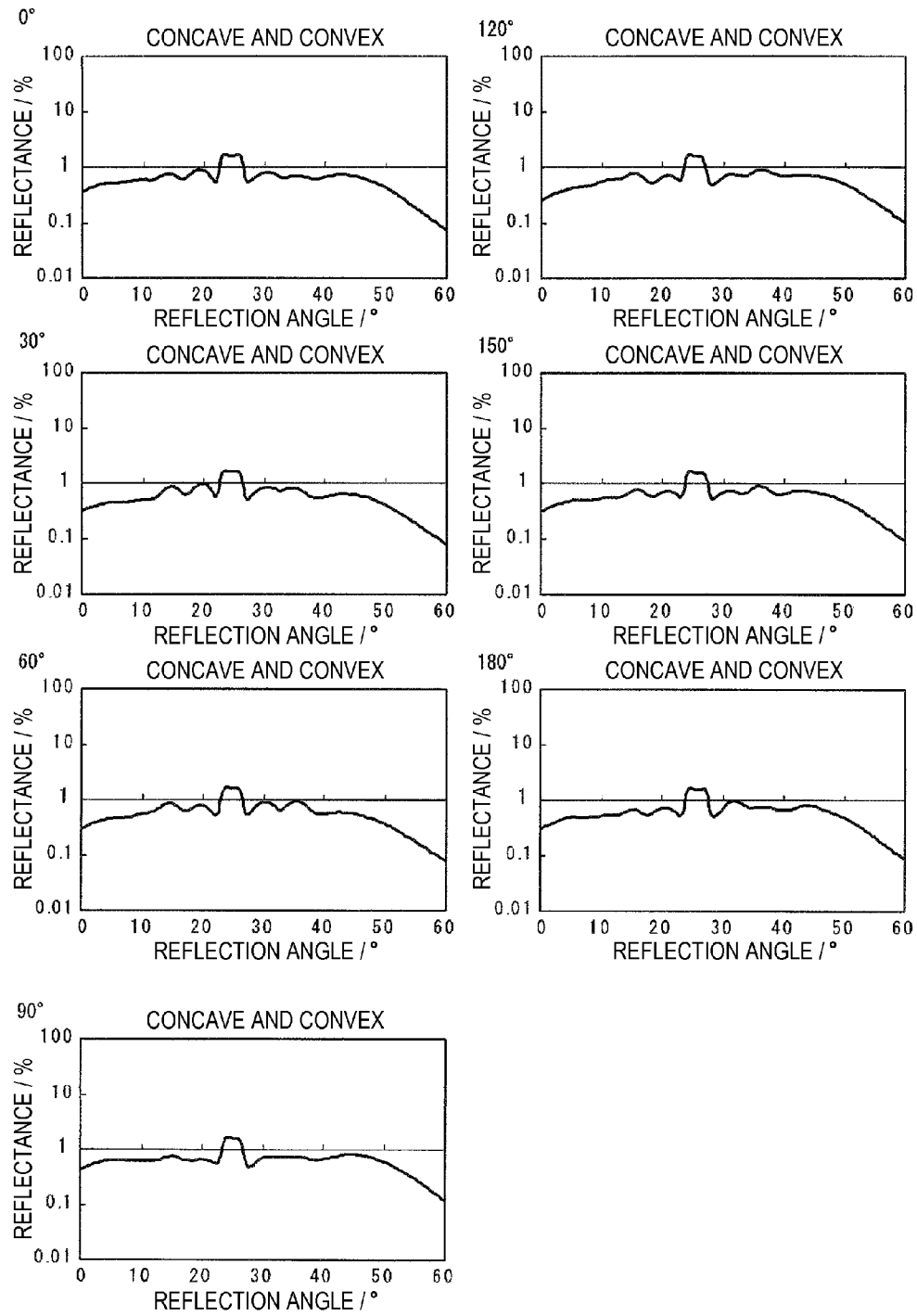
FIG. 5 shows examples of reflected light intensity distribution of the diffraction function portion (rotation angles from 0 to 180 degrees on a substrate surface).
Figure 6:
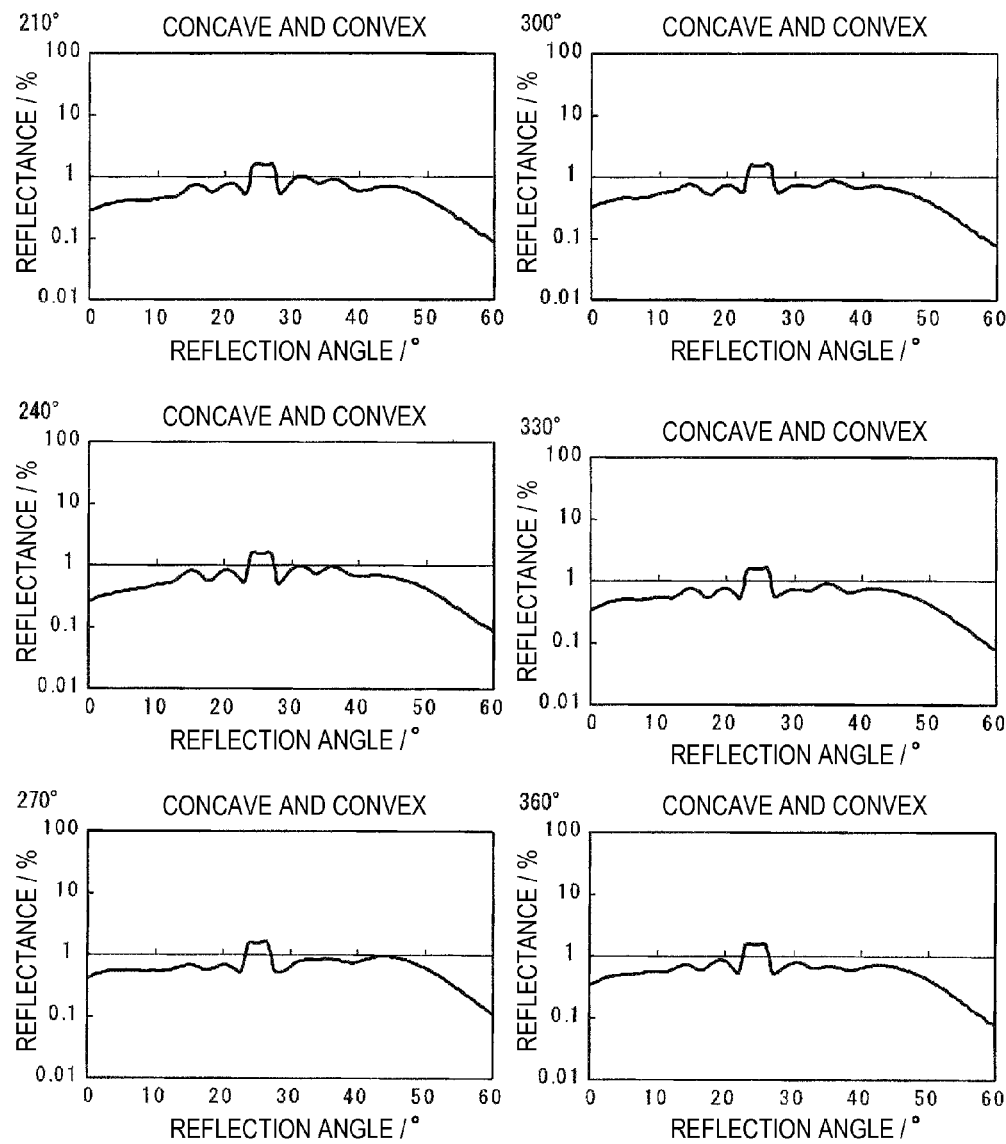
FIG. 6 shows examples of reflected light intensity distribution of the diffraction function portion (rotation angles from 210 to 360 degrees on the substrate surface).
Figure 7:
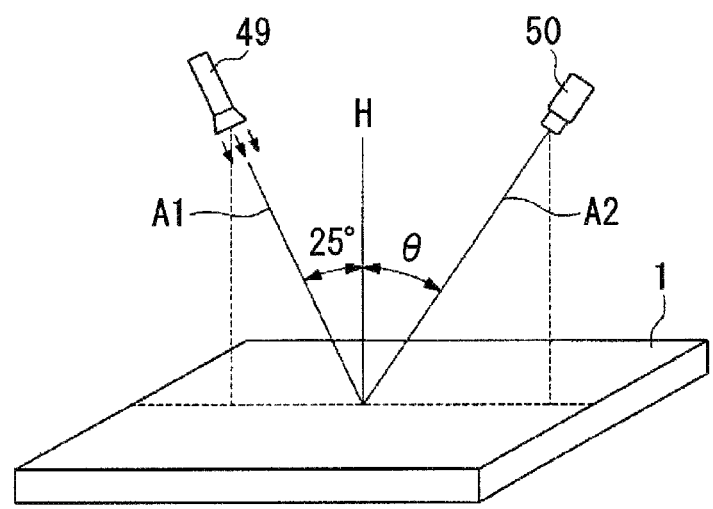
FIG. 7 is a schematic structure view of a measuring system employed in reflection characterization on the optical element.

When the optical element 1 is applied to a reflection type device, reflection characteristics are important. FIGS. 5 and 6 show examples of reflected light intensity distribution of the optical element 1 (diffraction function portion 4B). FIG. 7 is a schematic structure view of a measuring system employed in reflection characterization on the optical element. FIGS. 5 and 6 are graphs showing results of intensity measurement of reflected light. The horizontal axes indicate a reflection angle θ [°], while the vertical axes indicate reflected light intensity [%] when intensity of incident light is 100%.

In FIG. 7, the first regions 6A and the second regions 6B on the substrate 6 have a square shape in plan view.

As shown in FIG. 7, a light source 49 is fixed in an obliquely upward position with respect to the optical element 1 so that a light beam A1 from the light source 49 enters into the optical element 1 at 25 degrees with respect to a normal line direction H of a plane surface of the optical element 1. Then, intensity of a reflected light beam A2 is measured in a range of rotation angles from 0 to 360 degrees on the substrate surface with an illuminance meter 50.

As shown in FIGS. 5 and 6, maximum intensity of the reflected light is obtained as a peak exceeding a reflectance of 1% when the reflection angle is from about 23 to 27 degrees. Although the intensity dramatically drops at angles in the vicinity of the range above, the intensity at other angles gently decreases as a whole.

A width (range of a viewing field angle) φ of the reflected light distribution depends on a minimum size δ of the first regions 6A and the second regions 6B on the substrate 6 in plan view. The relation between the φ and δ satisfies φ=2λ/δ. For example, if λ is 550 nm and δ is 2.0 μm, the φ is 32 degrees. Therefore, a viewing field sufficient for practical use is obtained.

When the first regions 6A and the second regions 6B on the substrate 6 are made to have a circular shape in plan view, reflected light intensity distribution that is completely isotropic without depending on an azimuth orientation can be provided. Further, when the first regions 6A and the second regions 6B are made to be anisotropic in plan view, and to have a rectangular shape or an oval shape, for example, the reflected light intensity distribution that is anisotropic is also possible. In this case, the width of the distribution is expanded in the narrower width direction of each of the regions 6A and 6B, while the width of the distribution is reduced in the wider width direction thereof.

As described above, the optical element 1 having the grids G1 and G2 and the diffraction function portions 4 can separate the incident light 80 into the reflected light 80r and the transmitted light 80t that have different polarization states from each other by using the grids G1 and G2 while diffusing the reflected light 80r by the diffraction function portions 4. In particular, when the height g of the step parts 8 is made to satisfy gr=(2m+1)λ/4n, the reflected light 80r widely diffuses while the transmitted light 80t is prevented from diffusing. That is, according to the embodiment, the optical element 1 having both a polarization-separation function and a light diffusion function while preventing diffusion of the transmitted light only is obtained. Further, the optical element 1 is superior in light stability since the grids G1 and G2 performing polarization separation are composed of the micro-wires 2a made of aluminum.

(Manufacturing Method)

Figure 8:
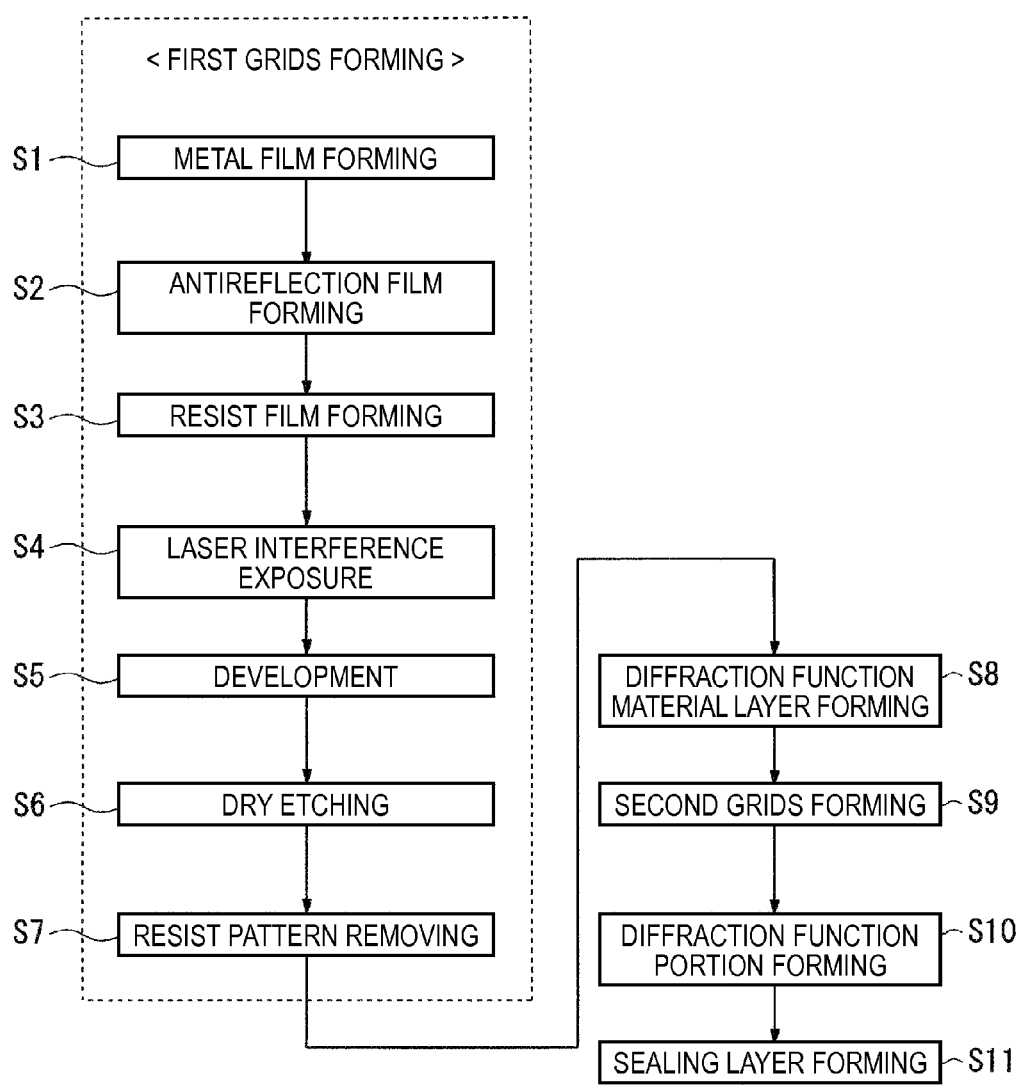
FIG. 8 is a flow chart showing a method for manufacturing the optical element according to the first embodiment.
Figure 9A:
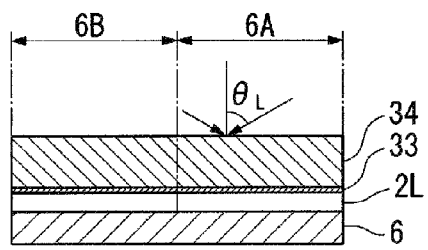
FIGS. 9A through 9H are sectional views showing the method for manufacturing the optical element according to the first embodiment.
Figure 9F:
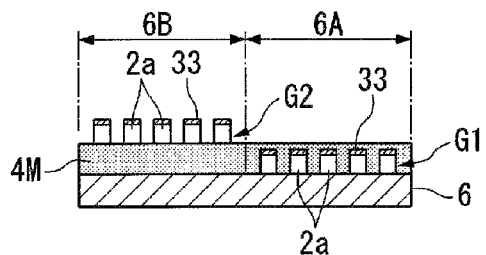
Figure 9B:
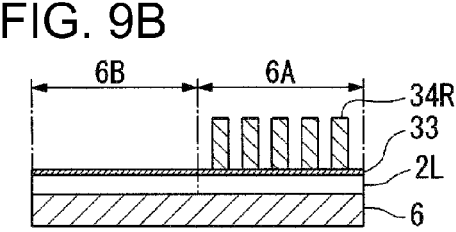
Figure 9G:
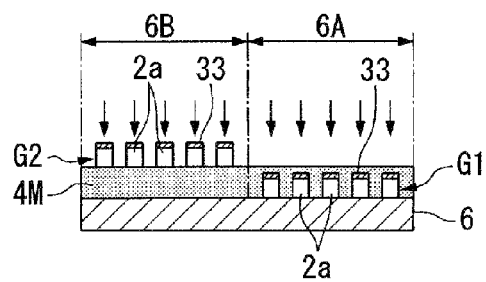
Figure 9C:
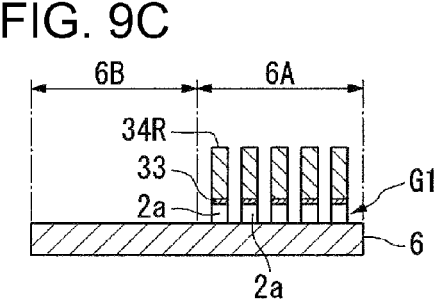
Figure 9H:
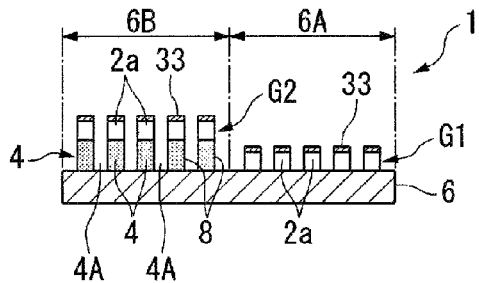

Referring now to FIGS. 8 to 9H, a method for manufacturing the optical element 1 will be described. FIG. 8 is a flowchart of the method for manufacturing the optical element. FIGS. 9A to 9H are sectional views showing steps for manufacturing the optical element. FIGS. 9A through 9H are partially enlarged views of the optical element, and actually, similar structures are continuously disposed over a whole of the substrate surface.

Referring to FIGS. 9A through 9H, the method for manufacturing the optical element 1 will be described along the flowchart in FIG. 8.

In step S1, a glass substrate of 0.7 mm in thickness is subjected to sputtering or the like so as to form a metal film 2L having a thickness of from about 100 nm to 300 nm and serving as a conductor film thereon (refer to FIG. 9A). In the embodiment, while aluminum (Al) is used as the metal film 2L, other metal materials such as silver (Ag) and nickel (Ni) may also be used. The substrate 6 in the embodiment has the plurality of first regions 6A and the plurality of second regions 6B that are partitioned in plan view on one surface thereof. The metal film 2L is formed so as to cover the plurality of first regions 6A and the plurality of second regions 6B. Here, the first regions 6A and the second regions 6B define positions to form the first grids G1 and the second grids G2 in a later step for descriptive purposes, so that no physical border lines are formed on the substrate surface.

In addition, a base layer (not illustrated) formed of a dielectric thin film made of $SiO_2$ or the like may also be formed between the substrate 6 and the metal film 2L. The base layer functions to improve adhesion strength between the substrate 6 and the metal film 2L (first wire grids).

Next, in step S2, an antireflection film 33 is formed on the metal film 2L by vacuum deposition, sputtering, or the like (FIG. 9A). Suitable examples of the material of the antireflection film 33 include SiC and $SiO_xN_y$:H (x, y are composition ratios). Or, indium tin oxide (ITO) may be used. Further, organic coating materials widely used in a semiconductor field may also be employed as the antireflection film 33. Whether the antireflection film 33 has an antireflection effect or not largely depends on a complex refractive index of the material. For example, the material preferably has a complex refractive index of 1.4 or more in its real part and has a complex refractive index of from 0.1 to 1.5 inclusive in its imaginary part. Note that an optimum thickness of the antireflection film 33 varies depending on the film-forming conditions even if the same material is used.

Next, in step S3, a resist film 34 having a nearly flat plane is formed on the antireflection film 33 by spin coating or the like (FIG. 9A).

Then, in step S4, the resist film 34 is subjected to laser interference exposure so as to selectively expose an area in which the micro-wires constituting the first wire grids G1 are to be formed, that is, an area formed by minute lines having a pitch of 140 nm, forming a latent image of the micro-wires. As a light source used for the laser interference exposure, a continuous-oscillation deep ultra violet (DUV) laser having a wavelength of 266 nm may be used. An incident angle θL may be, for example, 72 degrees (FIG. 9A). In this case, since the antireflection film 33 is formed under the resist film 34, laser light can avoid being reflected by the metal film 2L, thus preventing incomplete exposure.

Further, after the latent image of the micro-wires is formed on a whole surface of the resist film 34, an area overlapping with the first regions 6A in plan view is covered with a mask, and an area overlapping with the second regions 6B is thoroughly exposed. As the above, the latent image formed on the area overlapping with the second regions 6B is overexposed so as to leave the latent image of the micro-wires only in the area overlapping with the first regions 6A in plan view.

Next, in step S5, the resist film 34 subjected to laser interference exposure is developed. As described above, since the latent image formed on the area overlapping with the second regions 6B in plan view on the resist film 34 is overexposed, a resist pattern 34R is formed only in the area overlapping with the first regions 6A in plan view, and the resist film 34 in the second regions 6B is completely removed (FIG. 9B). Accordingly, the resist pattern 34R formed by minute lines with the pitch of 140 nm is provided on the first regions 6A.

Figure 9D:
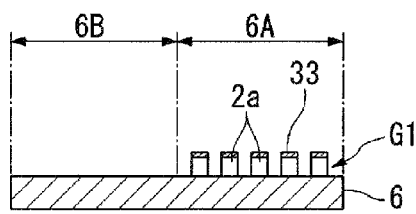
Figure 9E:
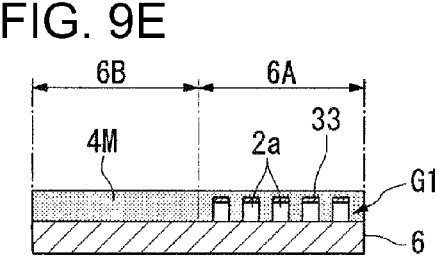

Next, in step S6, the metal film 2L and the antireflection film 33 are patterned. More specifically, dry etching is performed with the resist pattern 34R used as a mask so that the antireflection film 33 and the metal film 2L are patterned, forming the plurality of micro-wires 2a (FIG. 9C). In subsequent step S7, the resist pattern 34R is removed. The first grids G1 composed of the plurality of micro-wires 2a arranged at a pitch of 140 nm are thus formed in each of the first regions 6A on the substrate 6 (FIG. 9D).

If $SiO_2$ (with a thickness of 30 nm) is previously formed between the metal film 2L and the antireflection film 33, an etching selection ratio with respect to the metal film 2L is improved compared with that with respect to the resist film 34. Thus, a height of the pattern of the resist film 34 can be reduced. As a result, the resist pattern 34R that is more stable can be formed.

Next, in step S8, a diffraction function material layer 4M is formed on the substrate 6 (FIG. 9E) so as to cover the plurality of first grids G1. A film thickness of the diffraction function material layer 4M is made to be about from 10 nm to 200 nm depending on the height of the first grids G1. A temperature for baking should be around 250 degrees Celsius. In the embodiment, polymer having transparency is formed to be about 100 nm in thickness. Examples of a material for the diffraction function material layer 4M include $SiO_2$, ultraviolet-curing resin, thermoplastic resin, thermosetting resin, and the like. In this step, the diffraction function material layer 4M is formed on the substrate 6 by spin coating or the like, thereby making the substrate 6 to have a flat surface.

In subsequent step S9, the plurality of second grids G2 are formed in an area not overlapping with the first grids G1 in plan view on the diffraction function material layer 4M (FIG. 9F). The second grids G2 formed of the plurality of micro-wires 2a are obtained through the same steps as the steps for forming the first grids G1 (steps S1 through S7) by using the resist pattern 34R used for forming the first grids G1.

Further, in this step, the base layer is also preferably formed between the diffraction function material layer 4M and the second grids G2 in order to improve adhesion strength between the diffraction function material layer 4M and the second grids G2.

Next, in step S10, the diffraction function portions 4 are formed in the second regions 6B on the substrate 6. In this step, dry etching is performed to the whole of the diffraction function material layer 4M (FIG. 9G). Specifically, while the diffraction function material layer 4M in the first regions 6A is completely removed so as to expose the whole of the first grids G1, the diffraction function material layer 4M in an area not overlapping with the second grids G2 in plan view in the second regions 6B is partially removed (FIG. 9H). Accordingly, the grooves 4A penetrating through the diffraction function material layer 4M in a thickness direction are formed between the micro-wires 2a. Concurrently, the plurality of protruded threads 4B respectively corresponding to the micro-wires 2a is formed under the second grids G2. The diffraction function portions 4 are thus formed in the second regions 6B on the substrate 6.

This step is performed by dry etching using a mixed gas of $CHF_3$ and $O_2$. The grids G1 and G2 and the diffraction function material layer 4M are made of respective materials each having a different etching rate. Therefore, only the diffraction function material layer 4M is favorably etched without affecting the grids G1 and G2.

In subsequent step S11, the sealing layer 3 is formed on the first grids G1 and the second grids G2 (FIG. 2B). This step is performed, for example, by forming a layer made of $SiO_2$, SiN, or the like on the grids G1 and G2 under a vacuum environment by chemical vapor deposition (CVD), vacuum deposition, or the like. As a result, a space enclosed by the protruded threads 4B, the micro-wires 2a, and the sealing layer 3 is sealed in a vacuum state.

Consequently, the optical element 1 of the embodiment is achieved.

Through the steps above, the optical element 1 having the first grids G1 on the first regions 6A, and the diffraction function portions 4 and the second grids G2 on the second regions 6B that are layered on the substrate 6 can be obtained. According to this manufacturing method, since aluminum constituting the grids G1 and G2, and polymer constituting the diffraction function material layer 4M have different etching rates (selective ratio) from each other, the diffraction function material layer 4M is favorably patterned without using a resist pattern. This can shorten the manufacturing steps and improve operational efficiency.

Further, in the embodiment, the step for forming the first grids G1 and the step for forming the second grids G2 are separately performed so as to be respectively formed on the substrate and the diffraction function material layer 4M that have a flat surface. Therefore, uniformity of an exposure amount of the resist film 34 layered on the metal film 2L in the plane is improved, providing the resist pattern 34R that is desirable for obtaining the micro-wires 2a. Consequently, the first grids G1 and the second grids G2 are more securely formed on the surface of the diffraction function portions 4.

In the resist pattern 34R forming in the manufacturing steps above, after the latent image of the micro-wires is formed on the whole of the resist film 34, the latent image of the micro-wires in the second regions 6B is over-exposed so as to form the resist pattern 34R in the area overlapping with the first regions 6A in plan view. However, alternatively, the resist film 34 in the area overlapping with the first regions 6A in plan view may be first covered with a mask, then after the area overlapping with the second regions 6B is thoroughly exposed, the whole area is subjected to laser interference exposure so as to form a latent image of a grid pattern in the area overlapping with the first regions 6A in plan view.

Further, after the micro-wires 2a are formed on the whole of the substrate surface, only the micro-wires in the second regions 6B may be removed by etching. In this case, the micro-wires 2a in the first regions 6A are protected by a resist for grids (a film thickness of from 500 to 1000 nm, a baking temperature at from 100 to 200 degrees Celsius), and then the micro-wires 2a in the second regions 6B are removed by dry-etching with a chlorinated gas (such as $C_{12}$ and $BC_{13}$). The second grids G2 are also formed in the same manner.

Optical Element of Second Embodiment

Figure 10:
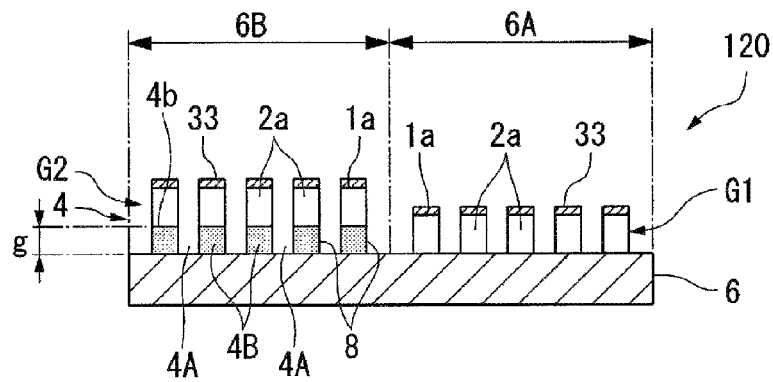
FIG. 10 is a sectional view showing a schematic structure of an optical element according to a second embodiment.
Figure 11:
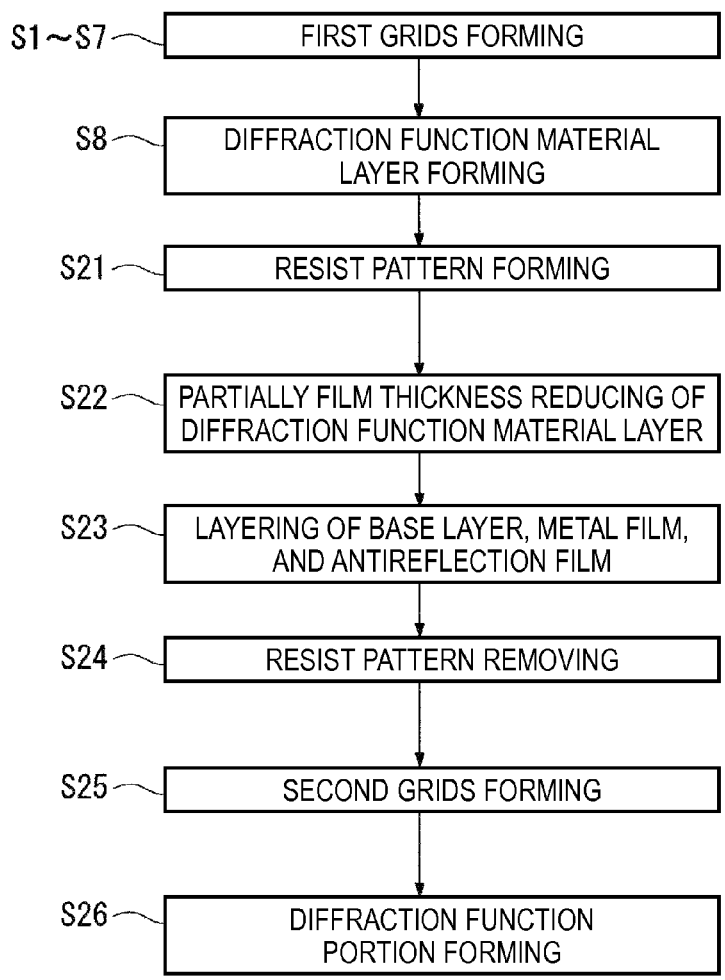
FIG. 11 is a flow chart showing a method for manufacturing the optical element according to the second embodiment.

FIG. 10 is a sectional view showing a schematic structure of an optical element according to a second embodiment. FIG. 11 is a flowchart of a method for manufacturing the optical element. FIGS. 12A through 12G are sectional views showing manufacturing steps of the optical element along the flowchart.

A difference of the second embodiment from the first embodiment above is the height g of the step parts 8 (depth of the grooves 4A). The other details of the structure of the optical element and the method for manufacturing the optical element are the same as those of the first embodiment above. Therefore, the same reference numerals are used for the components common to both embodiments, and their detailed descriptions and overlapping steps are omitted.

(Optical Element)

An optical element 120 according to the second embodiment includes, as shown in FIG. 10, the height g of the step parts 8 is made small so that the second grids G2 are positioned closer to the substrate 6 than those in the first embodiment. Specifically, the height of the protruded threads 4B in the diffraction function portions 4 is smaller than the height of the micro-wires 2a of the first grids G1. Therefore, the upper surfaces 4b of the protruded threads 4B are closer to the substrate surface than the upper surfaces 1a of the micro-wires 2a. In the second embodiment, the height g of the step parts 8 in the diffraction function portions 4 is nearly half of the height of the first grids G1.

(Manufacturing Method)

A method for manufacturing the optical element 120 will now be described using FIGS. 11 to 12G.

Figure 12A:
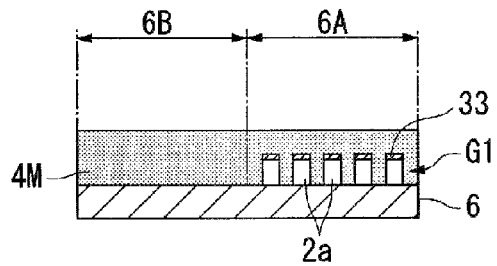
FIGS. 12A through 12G are sectional views showing the method for manufacturing the optical element according to the second embodiment.
Figure 12B:
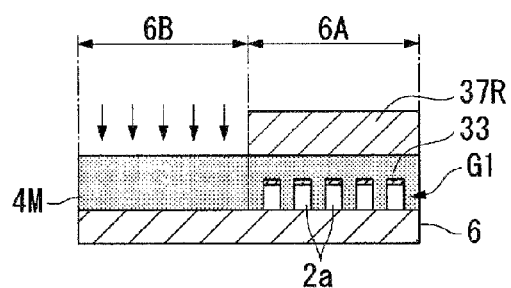

First, step S1 through S8 are performed similarly to the first embodiment, so that the first grids G1 and the diffraction function material layer 4M covering the first grids G1 are formed on the substrate 6 (FIG. 12A). Thereafter, in step S21, a resist pattern 37R is formed in the area overlapping with the first regions 6A in plan view on the diffraction function material layer 4M (FIG. 12B). In step S22, the area overlapping with the second regions 6B in plan view on the diffraction function material layer 4M is reduced in thickness to be in a predetermined thickness by dry etching using the resist pattern 37R as a mask. Specifically, the film thickness is made so that an etching surface 4m of the diffraction function material layer 4M is closer to the substrate surface than the upper surfaces 1a of the micro-wires 2a (FIG. 12C).

Figure 12C:
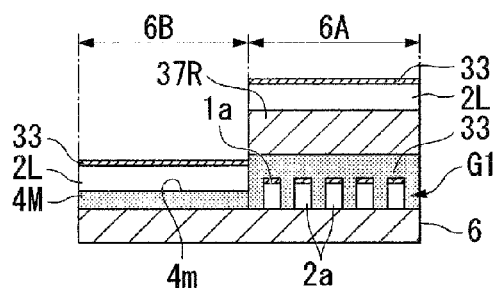
Figure 12D:
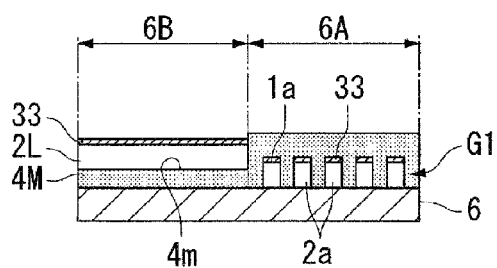
Figure 12E:
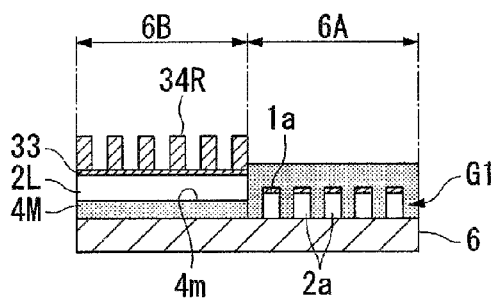
Figure 12F:
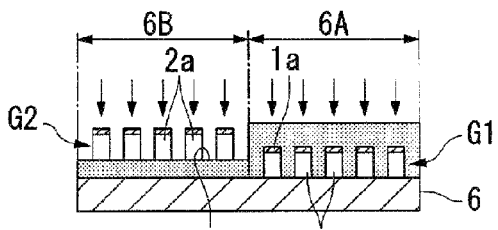
Figure 12G:
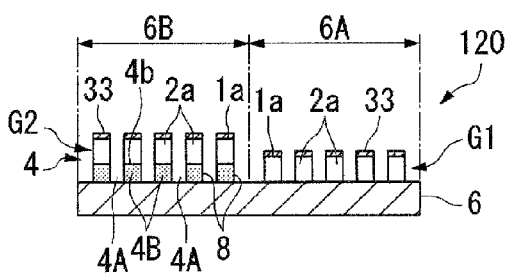

Thereafter, in step S23, a base layer (not illustrated), the metal film 2L, and the antireflection film 33 are layered in this order so as to cover an exposed part of the diffraction function material layer 4M (the region overlapping with the second region 6B in plan view), and the resist pattern 37R (FIG. 12C). In step S24, the resist pattern 37R is removed (FIG. 12D). Subsequently, in step S25, the resist pattern 34R is formed in the area overlapping with the second regions 6B in plan view (FIG. 12E), and then the diffraction function material layer 4M is dry etched by using the resist pattern 34R as a mask. Thereafter, the resist pattern 34R is removed and the plurality of second grids G2 are patterned (FIG. 12F). At this time, the film thickness of the diffraction function material layer 4M in the first regions 6A is slightly reduced by being etched. The resist pattern 34R used in the second embodiment is the same as the one used to form the first grids G1.

Thereafter, in step S26, the whole of the diffraction function material layer 4M is dry etched (FIG. 12F), forming the plurality of grooves 4A (protruded threads 4B) in the second regions 6B while exposing the first grids G1. As a result, the diffraction function portions 4 are provided (FIG. 12G). Consequently, the optical element 120 according to the second embodiment is achieved.

According to the second embodiment, in step S22, the height g of the step parts 8 is adjusted by adjusting the film thickness of the diffraction function material layer 4M in the second regions 6B. As shown in FIG. 10, if the depth of the grooves 4A in the diffraction function portions 4 is made smaller than that of the first grids G1 (the height g of the protruded threads 4B is reduced), a diffusion effect of the reflected light is improved even though a wavelength of the incident light entering into the diffraction function portions 4 is high. That is, by reducing the height g of the step parts 8 with respect to the first grids G1, an acceptable value of the wavelength that can make the diffusion effect of the reflected light by the diffraction function portions 4 maximum is improved.

Optical Element of Third Embodiment

Figure 13:
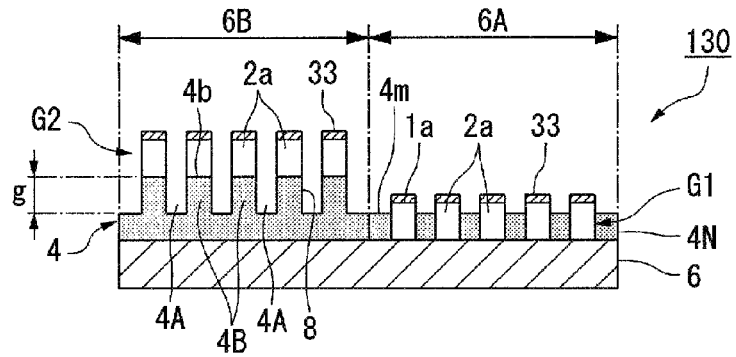
FIG. 13 is a sectional view showing a schematic structure of an optical element according to a third embodiment.

FIG. 13 is a sectional view showing a schematic structure of an optical element according to a third embodiment.

The third embodiment is different from the embodiments above in that a transparent insulating layer 4N covering the first regions 6A and the second regions 6B on the substrate 6 is formed, and thus a lower part of the first grids G1 is buried in the transparent insulating layer 4N. The other details of the structure of the optical element and the method for manufacturing the optical element are the same as those of the embodiments above. Therefore, the same reference numerals are used for the components common to the embodiments, and their detailed descriptions and overlapping steps are omitted.

(Optical Element)

An optical element 130 according to the third embodiment includes the transparent insulating layer 4N covering the first regions 6A and the second regions 6B on the substrate 6 as shown in FIG. 13. The lower part of the first grids G1 formed on the substrate 6 is buried in the transparent insulating layer 4N. Therefore, an upper part of the first grids G1 is exposed in the area overlapping with the first regions 6A in plan view in the transparent insulating layer 4N. On the other hand, in the area overlapping with the second regions 6B in plan view on the transparent insulating layer 4N, the diffraction function portions 4 and the second grids G2 are formed so as to be layered. Further, the plurality of grooves 4A, and the plurality of protruded threads 4B having the micro-wires 2a on the upper surfaces 4b are provided. The height g of the step parts 8 in the diffraction function portions 4 is appropriately determined from the heights of the grids G1 and G2.

In the third embodiment, after the first grids G1 and the diffraction function material layer 4M covering the first grids G1 are formed on the substrate 6 (FIG. 9E), only the diffraction function material layer 4M is etched during a predetermined period, thus providing the diffraction function portions 4. Specifically, as shown in FIG. 13, the etching is performed so that the etching surface 4m is closer to the substrate surface than the upper surfaces 1a of the micro-wires 2a constituting the first grids G1 and should be completed before the substrate surface is exposed. According to the above, the diffraction function portions 4 including the plurality of grooves 4A and the plurality of protruded threads 4B is formed while the transparent insulating layer 4N covering the substrate surface is formed.

According to the third embodiment, the transparent insulating layer 4N is formed in a shorter time than the time required for etching the diffraction function material layer 4M in the first embodiment. In the embodiments described above, the height g of the step parts 8 is adjusted by adjusting the film thickness of the diffraction function material layer 4M. However, in the third embodiment, the depth of the grooves 4A is adjusted by the time for etching the diffraction function material layer 4M. As a result, the height g of the step parts 8 is easily adjusted.

Optical Element of Fourth Embodiment

Figure 14:
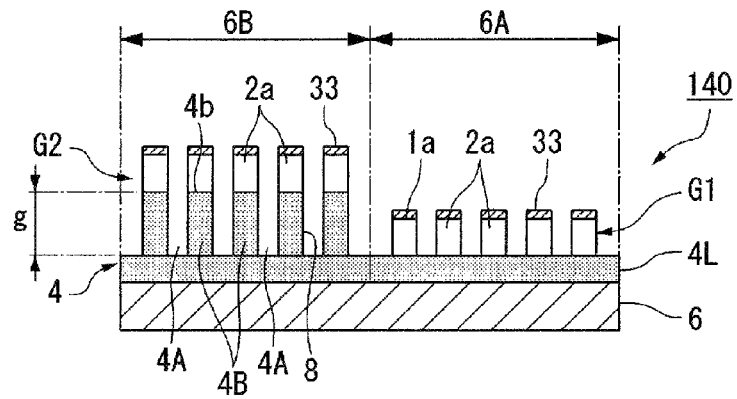
FIG. 14 is a sectional view showing a schematic structure of an optical element according to a fourth embodiment.

FIG. 14 is a sectional view showing a schematic structure of an optical element according to a fourth embodiment.

The fourth embodiment is different from the embodiments described above in that a transparent insulating material layer 4L is formed between the substrate 6 and the diffraction function portions 4, and the substrate 6 and the first grids G1. The other details of the structure of the optical element and the method for manufacturing the optical element are the same as those of the embodiments above. Therefore, the same reference numerals are used for the components common to the embodiments, and their detailed description and overlapping steps are omitted.

(Optical Element)

An optical element 140 according to the fourth embodiment includes, as shown in FIG. 14, the transparent insulating material layer 4L including areas of the first regions 6A and the second regions 6B on the substrate 6. The transparent insulating material layer 4L is made of the same material as that of the diffraction function portions 4 and formed to have a predetermined film thickness. The diffraction function portions 4 and the first grids G1 are disposed on the transparent insulating material layer 4L. Specifically, the first grids G1 are disposed in the area overlapping with the first regions 6A in plan view while the diffraction function portions 4 are disposed in the area overlapping with the second regions 6B in plan view, on the transparent insulating material layer 4L. In the fourth embodiment, the height g of the step parts 8 in the diffraction function portions 4 is made to be higher than the height of the first grids G1. That is, the upper surfaces 4b of the protruded thread 4Bs are further than the upper surfaces 1a of the micro-wires 2a constituting the first grids G1 with respect to the substrate surface.

In addition, in the fourth embodiment, it is also preferable that a base layer (not illustrated) be previously formed between the transparent insulating material layer 4L and the first grids G1 for improving adhesiveness therebetween.

The optical element 140 according to the fourth embodiment is formed through the same steps in the method for manufacturing an optical element in the first embodiment, except for a step for forming the transparent insulating material layer 4L on the substrate 6, which is added before step S1 for forming a base layer in the method for manufacturing an optical element in the first embodiment (refer to FIG. 8). According to the above, the transparent insulating material layer 4L is first formed on the substrate 6, and then the diffraction function portions 4, the first grids G1 and the like are subsequently formed on the transparent insulating material layer 4L, thus providing the optical element 140 according to the fourth embodiment.

The optical element 140 according to the fourth embodiment is provided with the transparent insulating material layer 4L on the substrate 6, and the first grids G1 and the diffraction function portions 4 are formed on the transparent insulating material layer 4L. The optical element 140 with such a structure can achieve favorable adhesiveness of the diffraction function portions 4 and the first grids G1 with respect to the substrate 6, and thus becomes highly reliable. Further, since the first grids G1 are formed on the transparent insulating material layer 4L, the optical element 140 becomes easy to be assembled into a display device.

Optical Element of Fifth Embodiment

Figure 15:
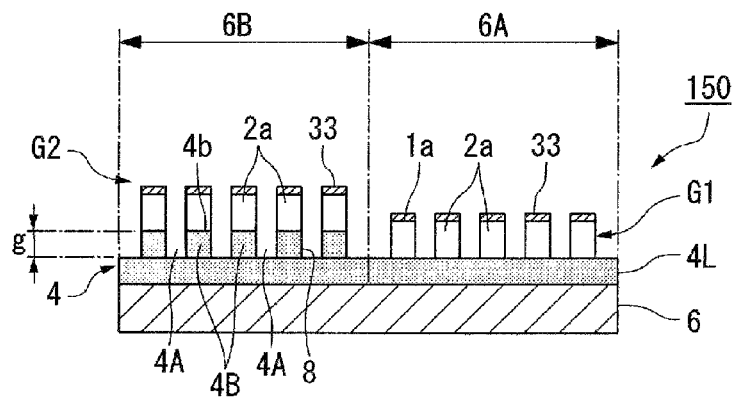
FIG. 15 is a sectional view showing a schematic structure of an optical element according to a fifth embodiment.

FIG. 15 is a sectional view showing a schematic structure of an optical element according to a fifth embodiment.

An optical element 150 according to the fifth embodiment has the same structure as that of the third embodiment in that the transparent insulating material layer 4L is formed on the substrate 6, except for the height g of the step parts 8.

As shown in FIG. 15, the optical element 150 in the fifth embodiment includes the diffraction function portions 4 and the first grids G1 formed on the substrate 6 via the transparent insulating material layer 4L, similarly to the third embodiment described above. However, the height g of the step parts 8 is made small so that the position of the second grids G2 is closer to the substrate 6 than that in the third embodiment. Specifically, the upper surfaces 4b of the diffraction function portions 4 are closer to the substrate surface than the upper surfaces 1a of the first grids G1, thereby the height g of the step parts 8 in the diffraction function portions 4 is nearly half of the height of the first grids G1.

The optical element 150 according to the fifth embodiment is formed through the same steps in the method for manufacturing an optical element in the second embodiment, except for a step for forming the transparent insulating material layer 4L on the substrate 6, which is added before step S1 for forming the first grids G1 in the method for manufacturing an optical element in the second embodiment (refer to FIG. 11). Resulting from the above, the first grids G1 and the diffraction function portions 4 are respectively formed on the substrate 6 via the transparent insulating material layer 4L, and then the step parts 8 lower than the height of the first grids G1 are formed in the area overlapping with the second regions 6B in plan view on the transparent insulating material layer 4L. Consequently, the optical element 150 according to the fifth embodiment is achieved.

Similarly to the embodiments described above, the optical element 150 according to the fifth embodiment can achieve favorable adhesiveness of the diffraction function portions 4 and the first grids G1 with respect to the substrate 6 due to the transparent insulating material layer 4L, and thus becoming highly reliable.

Alternatively, although the transparent insulating material layer 4L is formed on the substrate 6 in the fourth and fifth embodiments above, the transparent insulating material layer 4L may be replaced by a base layer having a uniform thickness. A film such as the diffraction function portions 4, the base layer, or the like that is formed to be in a uniform thickness on the whole of the substrate 6 is made to be extremely thin in thickness. Therefore, the diffraction function material layer 4M made thin when the grooves are formed between the grids G2 is considered to substantially expose the surface of the substrate 6.

Further, by adjusting the height g of the step parts 8 in the diffraction function portions 4, that is, adjusting the depth of the grooves 4A, a diffusion effect of the reflected light is made maximum even if a wavelength of the incident light is high. That is, while the incident light is separated into the reflected light and the transmitted light that have different polarization states from each other by the diffraction function portions 4 constituted by the protruded threads 4B that are made short, the reflected light is widely diffused while the transmitted light is prevented from diffusing.

In addition, in the embodiments above, although the antireflection film 33 remains on the micro-wires 2a constituting the grids G1 and G2, the antireflection film 33 may be removed from the micro-wires 2a after the metal film 2L is etched. However, since the antireflection film 33 is made of SiC, $SiO_xN_y$:H, or the like, when the sealing layer 3 is formed, a material such as $SiO_2$, SiN or the like is easy to adhere to the micro wires 2a, thereby favorably forming the sealing layer 3 on the grids G1 and G2. Therefore, the antireflection film 33 is not necessarily removed thoroughly from the grids G1 and G2, but made to be left.

[Liquid Crystal Device]

A liquid crystal device having the optical element according to the invention as a reflective polarizing layer embedded therein is now described with reference to the accompanying drawings.

The liquid crystal device according to another embodiment of the invention employs what is called a fringe-field switching (FFS) method, which is one of horizontal electric field methods displaying images by applying an electric field (a horizontal electric field) to liquid crystal in a substrate surface direction to control the alignment thereof. The liquid crystal device according to this embodiment is also a color liquid crystal device having a color filter on a substrate.

Figure 16:
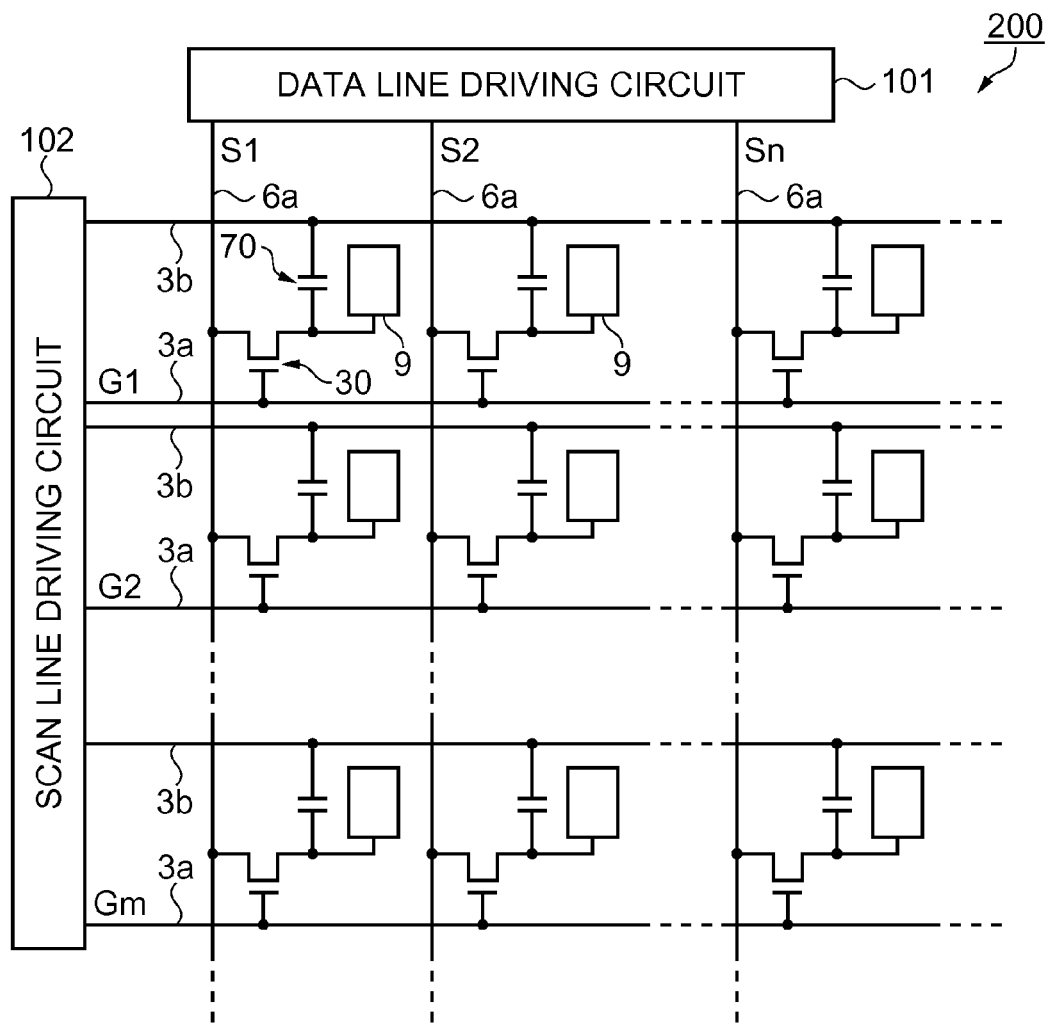
FIG. 16 is an equivalent circuit diagram of a plurality of sub-pixel regions formed in a matrix and included in a liquid crystal device according to the invention.
Figure 17A:
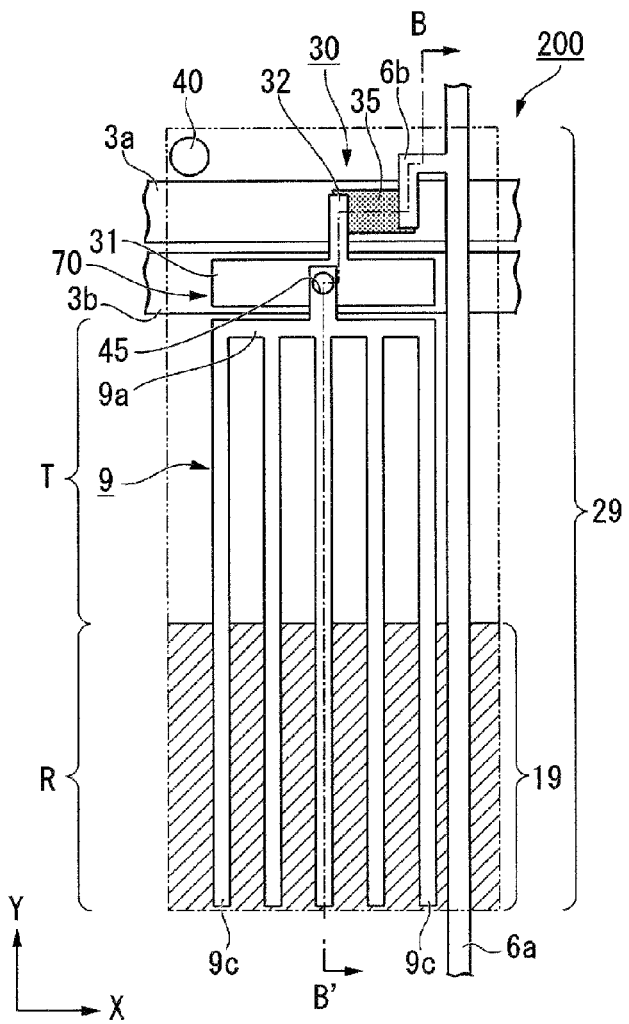
FIG. 17A is a plan view showing an arbitrary single sub-pixel region of the liquid crystal device according to the invention.
Figure 17B:
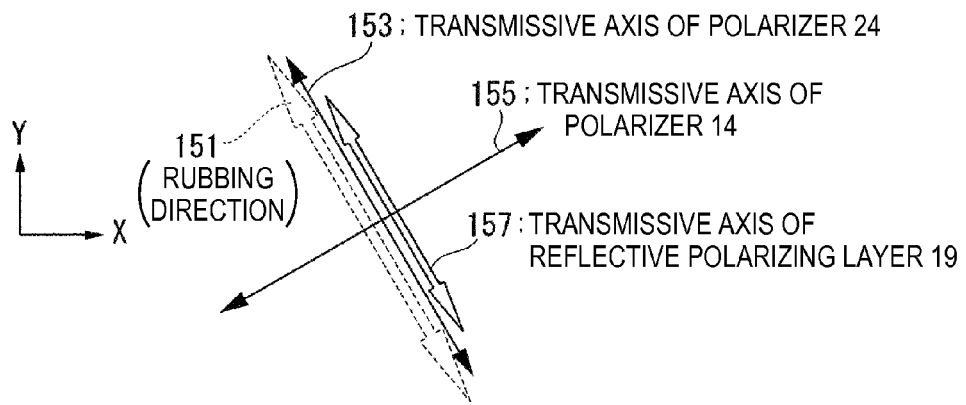
FIG. 17B is an explanatory diagram showing an arrangement relationship between optical axes of optical elements included in the liquid crystal device.
Figure 18:
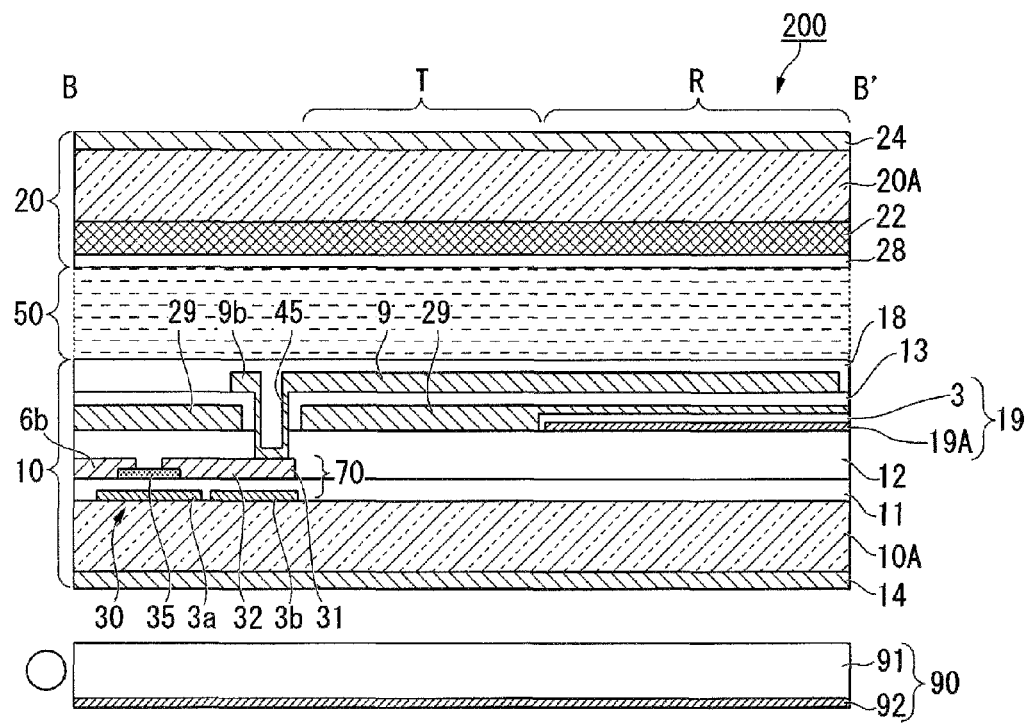
FIG. 18 is a partial sectional view taken along a line B-B' in FIG. 17A.

FIG. 16 is an equivalent circuit diagram showing a plurality of sub-pixel regions formed in a matrix, which are included in the liquid crystal device according to this embodiment. FIG. 17A is a plan view showing an arbitrary single sub-pixel region of the liquid crystal device. FIG. 17B is an explanatory view showing an arrangement relationship between optical axes of optical elements included in the liquid crystal device according to the embodiment. FIG. 18 is a partial sectional view taken along a line B-B' in FIG. 17A.

In each drawing, layers and members are shown in different scales so as to make them recognizable. In the following descriptions, FIGS. 1A, 1B, and 2 are arbitrarily referred for the descriptions.

As shown in FIG. 16, in each of the sub-pixel regions formed in a matrix, which constitutes an image display region of a liquid crystal device 200, a pixel electrode 9 and a thin film transistor (TFT) 30 performing a switching control of the pixel electrode 9 are formed. A data line 6a extended from a data line driving circuit 101 is electrically coupled to a source of the TFT 30. The data line driving circuit 101 supplies image signals S1, S2, ..., Sn respectively to corresponding pixels through the data lines 6a. The image signals S1, S2, ..., Sn may be supplied in a line-sequentially in this order or they may be provided by groups corresponding to a set of adjacent data lines 6a.

A gate of the TFT 30 is electrically coupled to a scan line 3a extending from a scan line driving circuit 102. Scan signals G1, G2, ..., Gm are supplied as a pulse respectively to corresponding scan lines 3a at a predetermined timing from the scan line driving circuit 102 and applied in a line-sequentially to corresponding gate of the TFTs 30. The pixel electrode 9 is electrically coupled to a drain of the TFT 30. When one of the TFTs 30 serving as a switching element is placed in an ON state only during a predetermined period of time by inputting one corresponding scan signal from the scan signals G1, G2, ..., Gm, one corresponding image signal from the image signals S1, S2, ..., Sn supplied from the data lines 6a is written into the pixel electrode 9 at a predetermined timing.

Each of the image signals S1, S2, ..., Sn having a predetermined level written in liquid crystal through the pixel electrode 9 is stored, in a certain period of time, between the pixel electrode 9 and a common electrode opposed to the pixel electrode 9 with the liquid crystal interposed therebetween. In order to prevent leakage of the stored image signal, a storage capacitance 70 is added parallel to a liquid crystal capacitance formed between the pixel electrode 9 and the common electrode. The storage capacitance 70 is provided between the drain of the TFT 30 and a capacitor line 3b.

Next, a detailed structure of the liquid crystal device 200 will be described by referring to FIGS. 17A, 17B and 18.

Referring to FIG. 18, the liquid crystal device 200 includes a liquid crystal panel having a TFT array substrate 10, an opposing substrate 20, and a liquid crystal layer 50 interposed therebetween. The liquid crystal layer 50 is sealed between the TFT array substrate 10 and the counter substrate 20 with a sealing material (not shown) provided along an edge of a region where the substrates 10 and 20 face each other. A backlight 90 including a light guiding plate 91 and a reflecting plate 92 is provided to a side adjacent to the back surface (a bottom side in FIG. 18) of the TFT array substrate 10.

As shown in FIG. 17A, in the sub-pixel region of the liquid crystal device 200, the pixel electrode 9 and a common electrode 29 are provided. The pixel electrode 9 has a longitudinal comb-teeth-like shape in plan view in an extending direction (Y-axis direction) of the data line 6a. The common electrode 29 is nearly flatly formed so as to overlap with the pixel electrode 9 in plan view. At the upper left corner of the sub-pixel region in FIG. 17A, a columnar spacer 40 is provided upright so that the TFT array substrate 10 and the counter substrate 20 are kept spaced apart from each other with a predetermined distance.

The pixel electrode 9 includes a base end part 9a, a contact part 9b, and a strip electrode part 9c. The strip electrode part 9c extends in a direction in which the data line 6a extends and provided in a plurality of numbers (5 strip electrode parts in FIG. 17A). The base end part 9a is coupled to each edge at a side adjacent to the TFT 30 of the strip electrode parts 9c and extends in a direction in which the scan line 3a extends. The contact part 9b (refer to FIG. 18) extends from the central portion of the base end part 9a in the extending direction of the scan line 3a to a side adjacent to the TFT 30.

The common electrode 29 is a transparent electrode that is flatly formed in the pixel region shown in FIG. 18. The reflective polarizing layer 19 is formed in the area overlapping with a part of the common electrode 29 in plan view. The reflective polarizing layer 19 includes the optical element of the invention. That is, the reflective polarizing layer 19 is provided with a polarizing element portion 19a including the micro-wires 2a having a micro slit structure and light reflectivity (refer to FIGS. 1A, 1B and 2).

The common electrode 29 may have a nearly rectangular shape in plan view with a nearly same size as the sub-pixel region. In this case, a common electrode wiring line extending across a plurality of common electrodes may be provided to electrically couple the common electrodes to each other, which are arranged in an extending direction of the common electrode wiring line.

The liquid crystal device 200 according to the embodiment is structured, in the single sub-pixel region shown in FIG. 17A, as follows. An area where the reflective polarizing layer 19 is formed serves as a reflective display region R. The area is a part of the planar region having the nearly rectangular shape in which region the pixel electrode 9 is provided. In the reflective display region R, light that is entered from the outside of the counter substrate 20 and passes through the liquid crystal layer 50 is reflected and modulated. In the region where the pixel electrode 9 is provided, another area where the reflective polarizing layer 19 is not formed so as to transmit light serves as a transmissive display region T. In the transmissive display region T, light that is entered from the backlight 90 and passes through the liquid crystal layer 50 is modulated.

The TFT 30 is coupled to the data line 6a that extends in the longitudinal direction (the X-axis direction) of the pixel electrode 9 and to the scan line 3a that extends in a direction orthogonal to the data line 6a (the Y-axis direction). The capacitor line 3b that extends in parallel and adjacent to the scan line 3a is provided. The TFT 30 includes a semiconductor layer 35, a source electrode 6b and a drain electrode 32. The semiconductor layer 35 is partially formed in a planar region of the scan line 3a and made of an amorphous silicon film. The source electrode 6b and the drain electrode 32 are formed so as to partially overlap with the semiconductor layer 35 in plan view. The scan line 3a serves as a gate electrode of the TFT 30 at a position where the line 3a overlaps with the semiconductor layer 35 in plan view.

The source electrode 6b of the TFT 30 is branched from the data line 6a and extended to the semiconductor layer 35 so as to be formed a nearly reversed-L shape in plan view. The drain electrode 32 extends from a position where the electrode 32 overlaps with the semiconductor layer 35 in plan view to a side adjacent to the pixel electrode 9, and an end of the drain electrode 32 is electrically coupled to a capacitor electrode 31 having a nearly rectangular shape in plan view. On the capacitor electrode 31, the contact part 9b protruding toward a side adjacent to the scan line 3a is disposed at an end of the pixel electrode 9 (refer to FIG. 18). The capacitor electrode 31 and the pixel electrode 9 are electrically coupled with a pixel contact hole 45 formed at a position where the electrode 31 and the electrode 9 are overlapped. The capacitor electrode 31 is disposed in a planar region of the capacitor line 3b to form the storage capacitance 70 having the capacitor electrode 31 and the capacitor line 3b as the electrodes. The capacitor electrode 31 and the capacitor line 3b face each other in a thickness direction of the capacitor electrode 31.

The liquid crystal device 200 of the embodiment is an FFS type liquid crystal device having the pixel electrode 9 and the common electrode 29 opposing the pixel electrode 9. Therefore, a relatively large capacitance is formed in an area where the pixel electrode 9 and the common electrode 29 overlap each other in plan view when a voltage is applied to the pixel electrode 9 in a display operation. Thus, in the liquid crystal device 200, the storage capacitance 70 may be omitted. This structure allows a formation region of the capacitor electrode 31 and the capacitor line 3b to be used also for a display, thereby improving a sub-pixel aperture ratio to increase the brightness of the display.

As can be seen from a sectional structure shown in FIG. 18, the liquid crystal layer 50 is provided between the TFT array substrate 10 and the counter substrate 20 that are opposed. The TFT array substrate 10 includes a substrate main body 10A that is made of glass, quartz or plastic and transmits light. The substrate main body 10A has the scan line 3a and the capacitor line 3b on its surface at a side adjacent to the liquid crystal layer 50. The scan line 3a and the capacitor line 3b are covered with a gate insulating film 11 made of a transparent insulating film such as silicon oxide.

On the gate insulating film 11, the semiconductor layer 35 made of amorphous silicon is formed. The source electrode 6b and the drain electrode 32 are provided in a manner of being partially placed on the semiconductor layer 35. The capacitor electrode 31 is formed integrally with the drain electrode 32.

The semiconductor layer 35 is disposed so as to oppose the scan line 3a with the gate insulating film 11 interposed therebetween. In a region between the semiconductor layer 35 and the scan line 3a that are opposed, the scan line 3a serves as the gate electrode of the TFT 30. The capacitor electrode 31 is disposed so as to oppose the capacitor line 3b with the gate insulating film 11 interposed therebetween. In a region where the capacitor electrode 31 and the capacitor line 3b are opposed, the storage capacitance 70 having the gate insulating film 11 as a dielectric film thereof is formed.

The semiconductor layer 35, the source electrode 6b, the drain electrode 32, and the capacitor electrode 31 are covered with an interlayer insulating film 12 made of silicon oxide or the like. The reflective polarizing layer 19 is partially formed on the interlayer insulating film 12. The reflective polarizing layer 19 employs the optical element of the invention. Therefore, the reflective polarizing layer 19 is provided with a polarizing element portion 19A including micro-wires.

Further, on the interlayer insulating film 12 and the reflective polarizing layer 19, the common electrode 29 made of a transparent conductive film is flatly formed. The common electrode 29 and the polarizing element portion 19A of the reflective polarizing layer 19 are isolated from each other by the sealing layer 3 that is a transparent insulating film.

An electrode part insulating film 13 made of silicon oxide or the like is formed so as to cover the common electrode 29. The pixel electrode 9 made of a transparent conductive material such as ITO is formed on the electrode part insulating film 13. The pixel contact hole 45 penetrates through the interlayer insulating film 12 and the electrode part insulating film 13 to reach the capacitor electrode 31. The contact part 9b of the pixel electrode 9 is partially embedded in the pixel contact hole 45 to electrically couple the pixel electrode 9 with the capacitor electrode 31. An opening is formed at least in the common electrode 29 corresponding to a formation region of the pixel contact hole 45, so that the common electrode 29 does not make contact with the pixel electrode 9. In addition, an alignment film 18 (horizontal alignment film) made of polyimide or the like is formed so as to cover the pixel electrode 9.

The counter substrate 20 includes a substrate main body 20A that is made of glass, quartz or plastic and transmits light. At the inner side of the counter substrate 20 (at a side adjacent to the liquid crystal layer 60), a color filter 22 and an alignment film 28 (horizontal alignment film) are layered. At the outer side of the counter substrate 20, a polarizer 24 that is a counterpart of a polarizer 14 provided at the outer side of the TFT array substrate 10 is formed.

Preferably, the color filter 22 is partitioned into two regions having different colors in the pixel region. That is, it is preferable that a first color material region corresponding to the transmissive display region T and a second color material region corresponding to the reflective display region R be partitioned. In this case, the first color material region arranged in the transmissive display region T has a color density greater than that of the second color material region. This can prevent color difference of display light between the transmissive display region in which the display light passes through the color filter 22 only once and the reflective display region in which the display light passes through the color filter 22 twice. Thus, visual quality can be maintained equal in the reflective display and the transmissive display, thereby improving display quality.

As shown in the arrangement diagram of optical axes of FIG. 17B, the reflective polarizing layer 19 of the liquid crystal device 200, is disposed so that a transmissive axis 157 (a direction orthogonal to the extending direction of the micro-wires 2a shown in FIGS. 1A, 1B, and 2) of the layer 19 is positioned parallel to a transmissive axis 153 of the polarizer 24 of the counter substrate 20, and orthogonal to a transmissive axis 155 of the polarizer 14 of the TFT array substrate 10. Additionally, in the liquid crystal device 200 according to the embodiment, alignment films 18 and 28 are subjected to rubbing treatment in the same direction in plan view, and the direction is a rubbing direction 151 shown in FIG. 17B. Thus, the transmissive axis 157 of the reflective polarizing layer 19 is parallel to the rubbing direction 151 of the alignment films 18 and 28.

The rubbing direction 151 makes an angle of about 30 degrees with respect to the strip electrode part 9c extending parallel to the pixel arrangement direction (Y-axis direction) of the liquid crystal device 200.

The liquid crystal device 200 structured as above is the FFS-method liquid crystal device. Thus, when an image signal (voltage) is applied to the pixel electrode 9 via the TFT 30, an electric filed is produced between the pixel electrode 9 and the common electrode 29 in the substrate surface direction (X-axis direction in FIGS. 17A and 17B in plan view). Then, liquid crystal molecules are operated by the resulting electric field to change the transmittance/reflectance of each sub-pixel, thereby displaying images.

The alignment films 18 and 28 that are opposed with the liquid crystal layer 50 interposed therebetween are processed with rubbing in the same direction in plan view. The liquid crystal molecules forming the liquid crystal layer 50 horizontally align along the rubbing direction between the substrates 10 and 20 when a voltage is not applied to the pixel electrode 9. When the electric field produced between the pixel electrode 9 and the common electrode 29 is applied to the liquid crystal layer 50 having the liquid crystal molecules aligned in the above state, the liquid crystal molecules are re-aligned in the line width direction (X-axis direction) of each strip electrode part 9c shown in FIG. 17A. The liquid crystal device 200 takes advantage of birefringence based on the different alignment states of the liquid crystal molecules to perform bright and dark display states. When the liquid crystal device 200 is operated, the common electrode 29 at least needs to keep a voltage at a certain level so as to provide a voltage difference within a predetermined range between the common electrode 29 and the pixel electrode 9.

The liquid crystal device 200 according to this embodiment can reflect a TE polarized component and transmit the TM polarized component due to an act of the reflective polarizing layer 19. Concurrently, the reflected light is widely diffused, thereby achieving high visibility. In addition, the transmitted light is diffused and the diffused light is used in a transmissive region adjacent thereto. Further, the light (TE polarized component) passing through the polarizer 14 disposed at the lower part of the reflective polarizing layer 19 is also used in the transmissive display region T adjacent thereto after being reflected and diffused by the reflective polarizing layer 19. Therefore, light efficiency is improved about 20% overall. This can save a light amount of the back light 90 used in the transmissive display region T, achieving low power consumption.

In the embodiment, the liquid crystal device has the reflective polarizing layer 19 corresponding to the reflective display region. Therefore a favorable contrast can be obtained both in the transmissive display and the reflective display without using a multi-gap structure. Further, the reflective polarizing layer 19 is formed by employing the wire grid type optical element according to the invention. In the optical element, the micro-wires 2a covered with the sealing layer 3 are formed (refer to FIGS. 1A, 1B, and 2). Therefore, the common electrode 29 formed on the reflective polarizing layer 19 is prevented from entering the openings 2b (refer to FIG. 2) between the micro-wires 2a to deteriorate the optical characteristics of the reflective polarizing layer 19. As a result, the reflective polarizing layer 19 can obtain optical characteristics superior in both transmissivity and contrast (polarization selectivity).

The reflective polarizing layer 19 to perform a reflective display is provided in a TFT array substrate 10 side. This structure can effectively prevents display quality from being deteriorated due to reflection of outside light by metal wiring lines and the like that are formed on the TFT array substrate 10 together with the TFT 30. The pixel electrode 9 made of the transparent conductive material can also prevent outside light inputted to the TFT array substrate 10 after passing through the liquid crystal layer 50 from being diffusely reflected by the pixel electrode 9. As a result, excellent visibility can be achieved.

[Projector]

Figure 19:
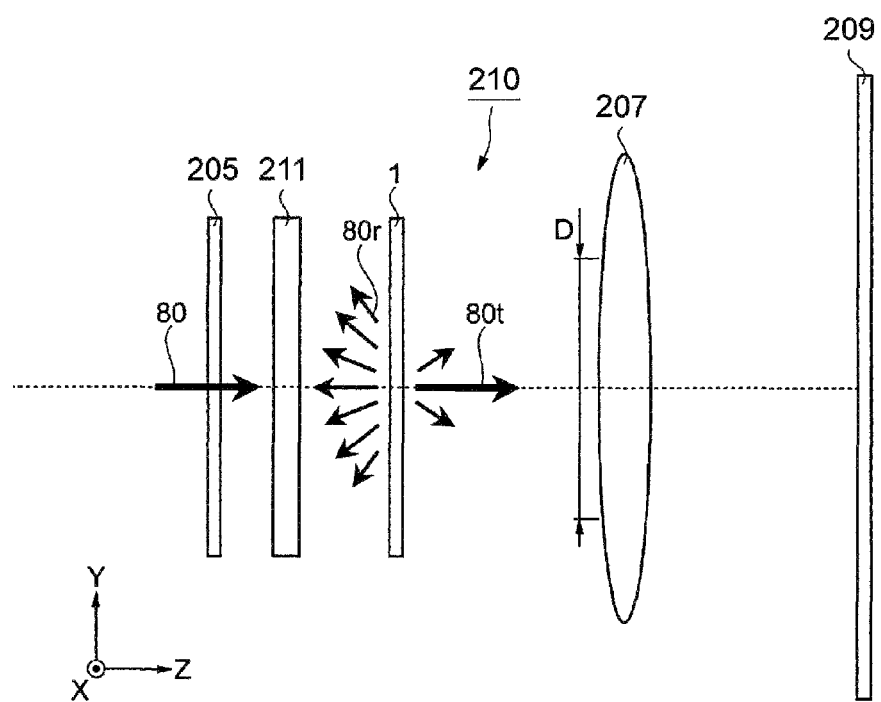
FIG. 19 is a schematic view showing a rough structure of a projector.

Next, a case where the optical element of the invention is applied to a projection display device will be described. FIG. 19 is a schematic view showing an optical system of a projector 210, which is one of projection display devices. In the projector 210, light emitted from a light source (lamp) is modulated by a liquid crystal device 211 and the modulated light is projected forward from a projection lens 207.

In FIG. 19, a dashed line shows a light path of the light emitted from the light source in the projector 210. In the light path, an optical element 205, the liquid crystal device 211, the optical element 1, and the projection lens 207 are disposed in this order. In other words, the optical element 1 is disposed at any position between the liquid crystal device 211 and the projection lens 207 in the light path. Next to the projection lens 207 in the light path, a screen 209 is disposed. In the projector 210, a display in the liquid crystal device 211 is enlarged and projected to the screen 209 through the projection lens 207.

The optical element 205 has a number of micro-wires each of which is made of a conductive material and disposed parallel on a substrate having transparency. The optical element 205 reflects a light component having a polarization axis parallel to the micro-wires among light components of the incident light 80 and transmits a light component having a polarization axis perpendicular to the micro-wires. That is, the optical element 205 has a polarization-separation function. The optical element 205, however, does not have a function to diffuse the reflected light and transmitted light because it is simply structured to have micro-wires formed on a flat substrate. Among the light components of the incident light 80, a light component after passing through the optical element 205 mostly enters the liquid crystal device 211 without being diffused.

The liquid crystal device 211 includes an element substrate, a counter substrate, and liquid crystal. The liquid crystal is sealed between the element substrate and the counter substrate that are bonded together with a sealant having a frame shape. The liquid crystal changes its alignment state by a driving voltage applied through electrodes formed on opposing surfaces of the element substrate and the counter substrate. The liquid crystal device 211 can change a polarization state of the transmitted light according to the alignment state of the liquid crystal.

Light after passing through the liquid crystal device 211 enters into the optical element 1. As described above, the optical element 1 transmits the light component having a polarization axis perpendicular to the micro-wires to let the light component enter the projection lens 207 and reflects the light component having a polarization axis parallel to the micro-wires. The optical element 1 is preferably disposed so as to be apart from the liquid crystal device 211 as much as possible in order to reduce problems caused by the reflected light 80r in the liquid crystal device 211.

[Modification of Projector]

Figure 20:
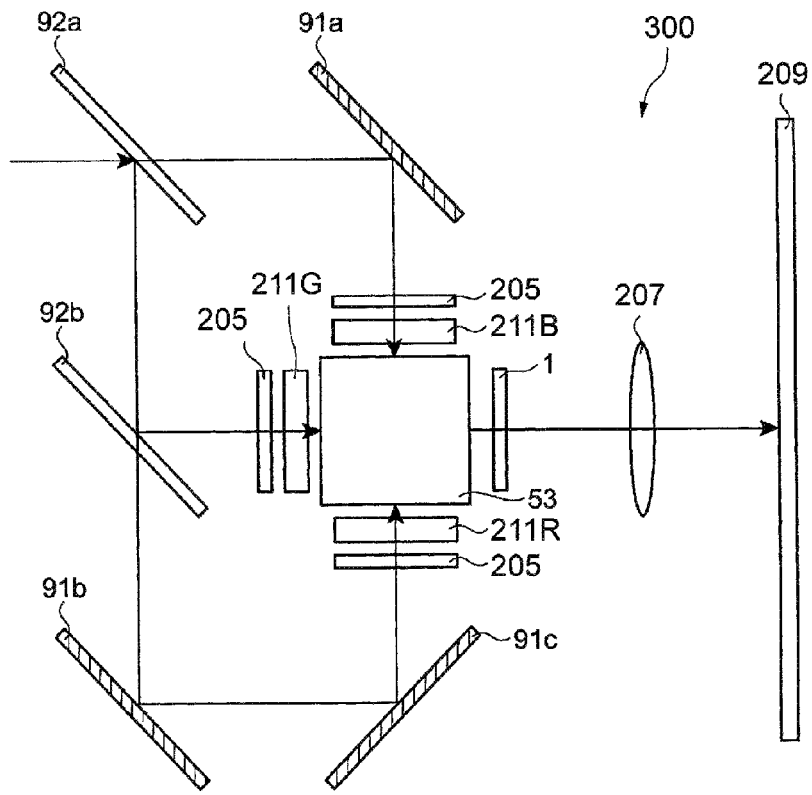
FIG. 20 is a schematic view showing a modification of the projector.

A modification of the projector provided with the optical element of the invention will be described with reference to FIG. 20. In the following description, the same reference numerals is given to the same structures as those of the above-described embodiments.

The projector 210 may include a plurality of liquid crystal devices 211. FIG. 20 is a schematic view showing an optical system of the projector 210 provided with three of the liquid crystal devices 211. This optical system includes a prism 53 having 4 faces, the optical element 1 disposed so as to face one of the faces of the prism 53, and liquid crystal devices 211R, 211G, and 211B each of which faces one of three faces of the prism 53 other than the face that the optical element 1 faces.

The prism 53 can refract light components entering to the prism 53 from the liquid crystal devices 211R, 211G, and 211B so that each light component enters into the optical element 1. In other words, the prism 53 is disposed in a light path from each of the liquid crystal devices 211R, 211G, and 211B to the optical element 1. The liquid crystal devices 211R, 211G, and 211B respectively intensity modulate a red light component, a green light component, and a blue light component. The intensity modulated light components are synthesized by the prism 53, providing display light. The optical element 205 is disposed at each side facing the prism 53 across each of the liquid crystal devices 211R, 211G, and 211B. The optical system further includes the projection lens 207 receiving light emitted from the optical element 1, mirrors 91a, 91b, and 91c, and dichroic mirrors 92a and 92b. The projection lens 207 is disposed in an extending line of the light path from the prism 53 to the optical element 1.

Light emitted from a light source (not shown) enters into the dichroic mirror 92a and only a blue light component passes through the mirror 92a. The blue light component is reflected by the mirror 91a and successively passes through the optical element 205 and the liquid crystal device 211B. Remaining light components reflected by the dichroic mirror 92a enter into the dichroic mirror 92b and a green light component is reflected while a red light component passes through the mirror 92a. The green light component successively passes through the optical element 205 and the liquid crystal device 211G. Further, the red light component is reflected by the mirror 91b and the mirror 91c and then successively passes through the optical element 205 and the liquid crystal device 211R. The red light component after passing through the liquid crystal device 211R, the green light component after passing through the liquid crystal device 211G, and the blue light component after passing through the liquid crystal device 211B enter the prism 53 and are changed their traveling directions so as to be emitted toward the optical element 1.

As described above, the optical element 1 transmits a light component in the incident light having a polarization axis perpendicular to the micro-wires to let the light component enter the projection lens 207 and reflects a light component having a polarization axis parallel to the micro-wires. Here, reflected light is widely diffused by the diffraction function portions 4 to enter the prism 53 and reach each of the liquid crystal devices 211R, 211G, and 211B while being in the diffused state. As a result, the reflected light does not hinder the stable operations of the liquid crystal devices 211R, 211G, and 211B. In addition, the transmitted light is sufficiently prevented from being diffused, thereby reaching the screen 209 while hardly loosing a light amount. Consequently, a projector 300 that has a bright display and long product life can be achieved.

[Electronic Apparatus]

Figure 21:
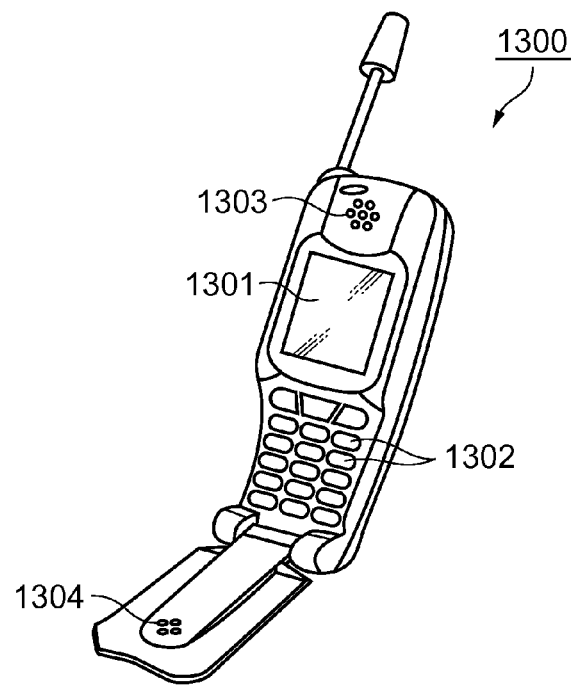
FIG. 21 is a perspective view showing an example of electronic apparatuses according to the invention.
Figure 22A:
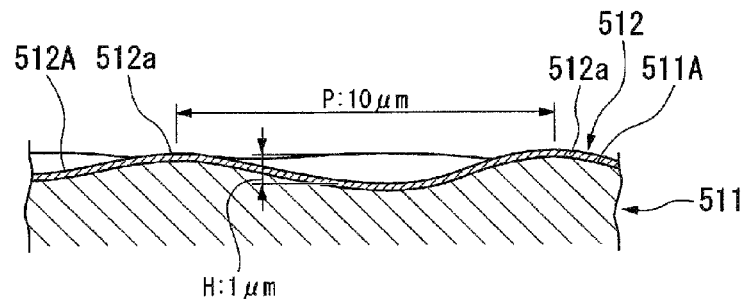
FIGS. 22A and 22B are perspective views of a metal film in a process of forming a wire grid in related art.
Figure 22B:
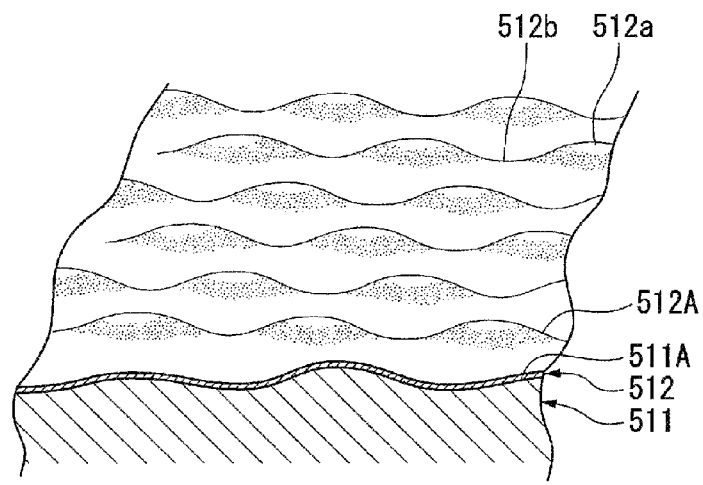
Figure 23:
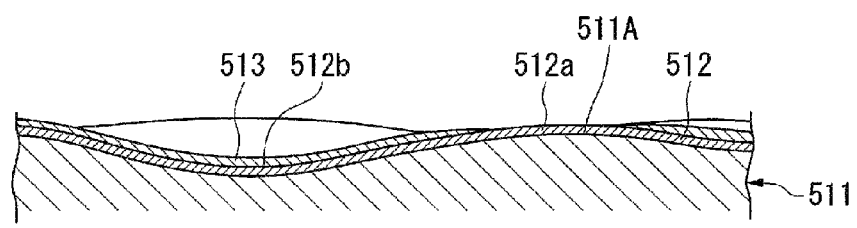
FIG. 23 is a sectional view showing a state of a resist applied on the metal film in related art shown in FIGS. 22A and 22B.
Figure 24:
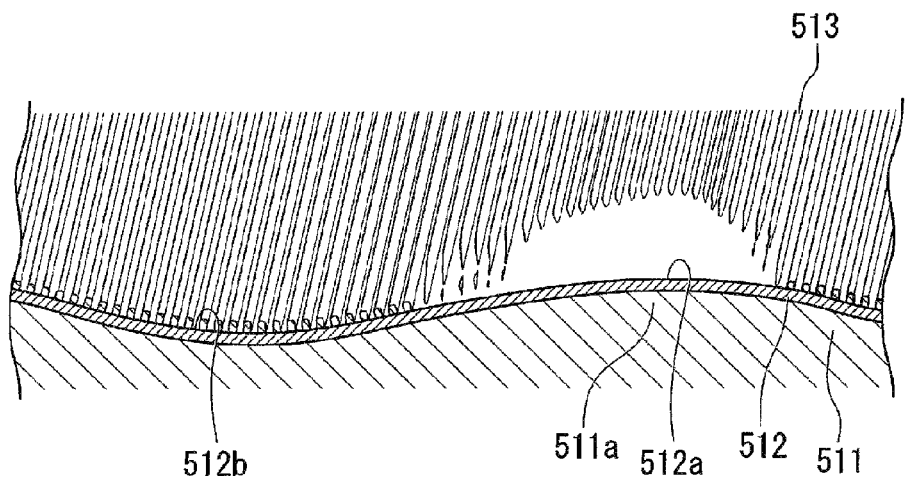
FIG. 24 is a perspective view showing a state after the resist shown in FIG. 23 is exposed.
Figure 25:
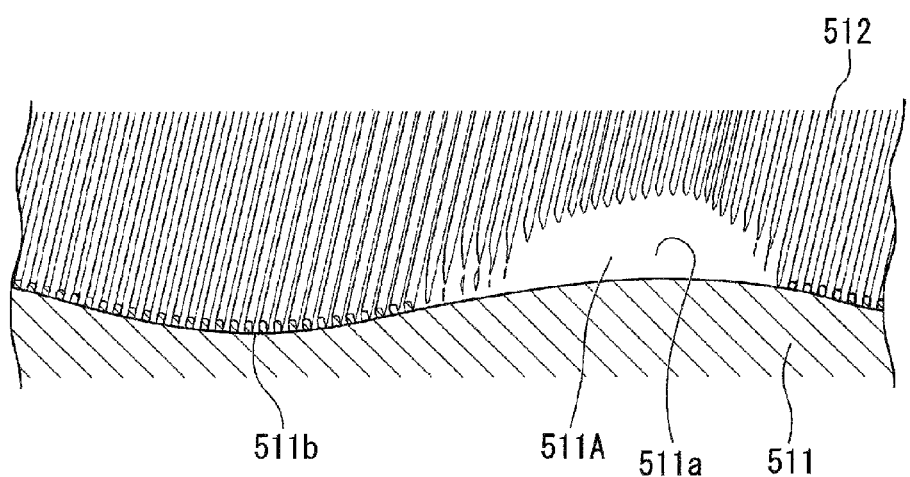
FIG. 25 is a perspective view showing a state after the metal film is etched based on a pattern of the resist shown in FIG. 24.
Figure 26A:
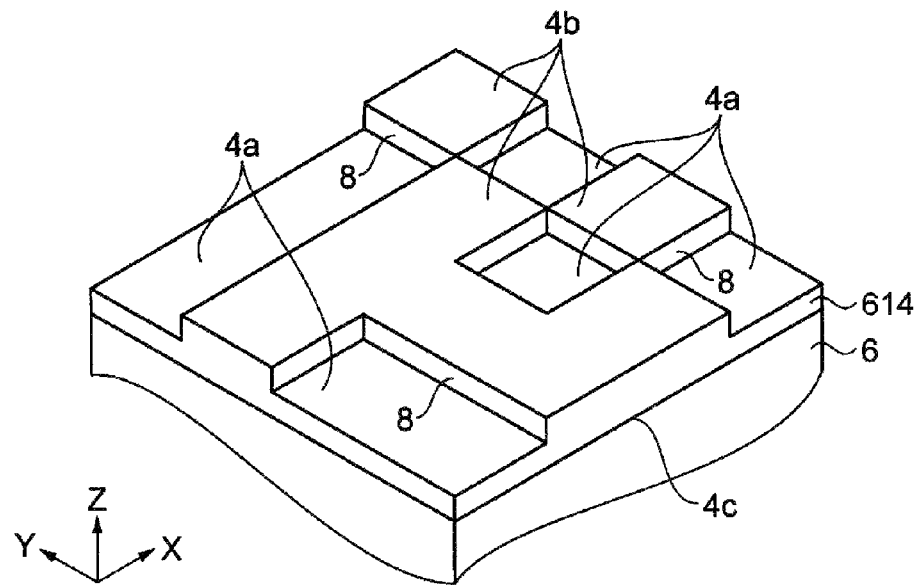
FIG. 26A is a perspective view showing an optical element in related art.
Figure 26B:
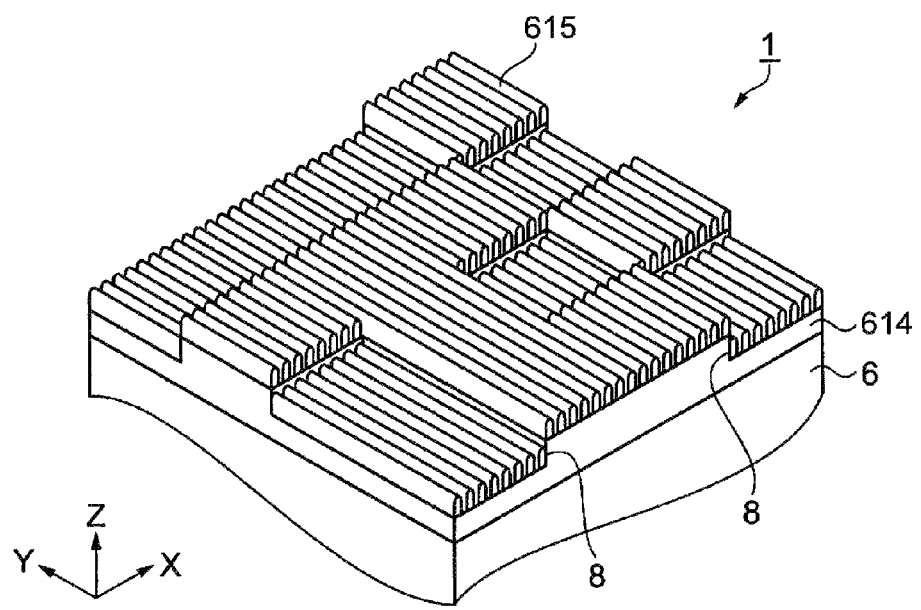
FIG. 26B is a perspective view showing a rough structure of a diffraction function portion.
Figure 27:
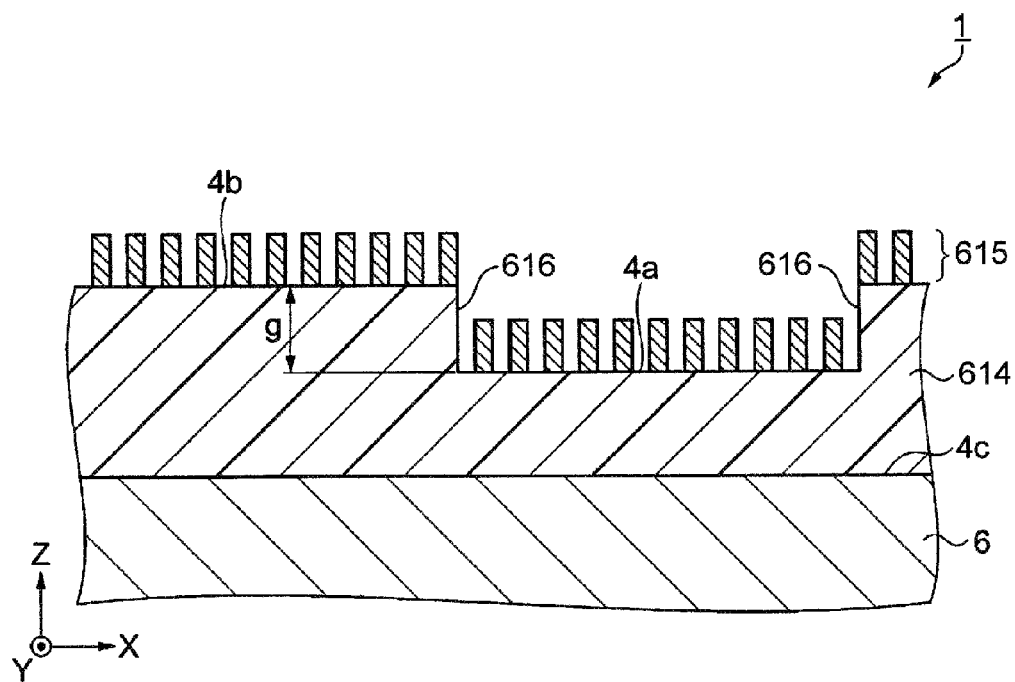
FIG. 27 is a sectional view of the optical element taken along an X-Z plane in FIG. 26A.
Figure 28:
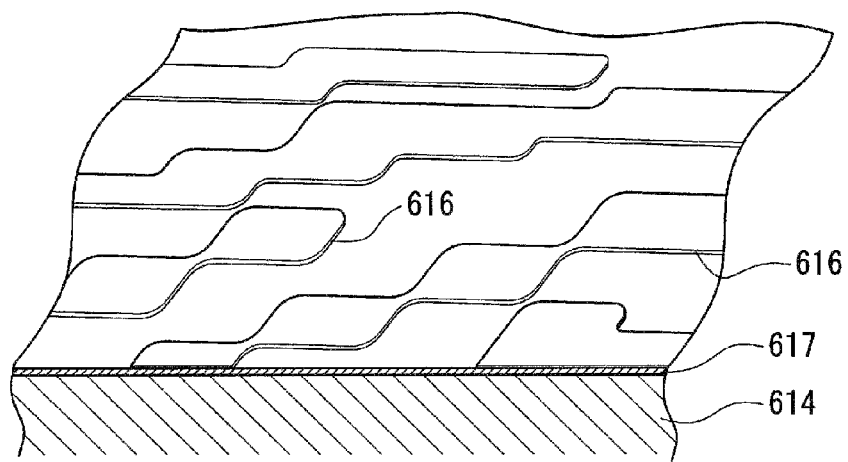
FIG. 28 is a perspective view showing a state after a resist is applied on the diffraction function portion shown in FIGS. 26A, 26B, and FIG. 27.
Figure 29:
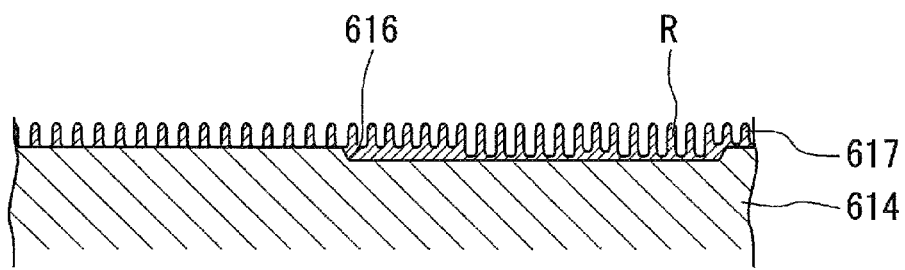
FIG. 29 is a sectional view showing a resist pattern after the resist shown in FIG. 28 is exposed.

FIG. 21 is a perspective view of a cellar phone that is an example of electronic apparatuses having the liquid crystal device of the invention as a display. A cellar phone 1300 includes a small size display 1301 that is the liquid crystal device according to the above-described embodiment, a plurality of operation buttons 1302, an earpiece 1303, and a mouthpiece 1304.

In addition to the above cellar phone, as an image display device, the liquid crystal device of the embodiment may be suitably applied to electronic books, personal computers, digital still cameras, liquid crystal television sets, view-finder type or monitor direct-view-type video tape recorders, car navigation devices, pagers, electronic organizers, electronic calculators, word processors, work stations, video phones, point of sale (POS) terminals, devices equipped with a touch panel, or the like. Any of the electronic apparatuses can provide transmissive and reflective displays with a high luminance, high contrast and a wide view angle.

Although the preferred embodiments of the invention have been described with reference to the accompanying drawings, the invention is not limited to those embodiments. Further, each embodiment may also be combined. Naturally, those skilled in the art will be able to presume many variations and modifications within the purview of the technical idea disclosed in the scope of claims of the invention. It will be understood that those variations and modifications are obviously within the technical scope of the invention.

In addition to such application to displays, the optical element according to the embodiments above may be used as a diffractive beam splitting element for laser processing, an antireflection structure for a beam forming element, or the like, for example.

What is claimed is:

1. An optical element, comprising:
   a substrate including a plurality of first regions and a plurality of second regions that are partitioned in plan view;
   a first grid one-dimensionally formed in the plurality of first regions on the substrate;
   a diffraction function portion disposed in one of the plurality of second regions, the diffraction function portion including a plurality of grooves parallel to each other;
   a plurality of protruded threads, the plurality of grooves being formed in the one of the plurality of second regions on the substrate and not being formed in the plurality of first regions on the substrate; and
   a second grid formed in a region on the plurality of protruded threads excluding the plurality of grooves,
   wherein the first and second grids each reflect a part of incident light and transmit a part of the incident light,
   the second grid and the plurality of protruded threads are formed of different materials;
   the first and second grids each have a polarization-separation function; and
   one first region of the plurality of first regions is provided between two second regions of the plurality of second regions when viewed in a cross-section of the substrate.

2. The optical element according to claim 1, wherein the plurality of grooves penetrate through the diffraction function portion to reach the substrate in a thickness direction of the diffraction function portion.

3. A liquid crystal device, comprising the optical element according to claim 1.

4. The liquid crystal device according to claim 3, further comprising a liquid crystal layer between a pair of substrates, wherein the optical element is formed at a side of at least one of the pair of substrates, the side being adjacent to the liquid crystal layer.

5. The liquid crystal device according to claim 3, wherein the liquid crystal device is a transflective liquid crystal device capable of providing both a transmissive display and a reflective display in a single pixel, and the optical element is provided as a reflective layer for the reflective display.

6. An electronic apparatus, comprising the liquid crystal device according to claim 3.

7. An electronic apparatus, comprising the optical element according to claim 1.

8. The optical element according to claim 1, wherein the second grid is disposed to have a height relative to the substrate greater than a height of the first grid relative to the substrate.

9. The optical element according to claim 8, wherein a size of one of the plurality of first regions and a size of the one of the plurality of second regions are larger than a wavelength of incident light.

10. A liquid crystal device comprising the optical according to claim 8.

11. A liquid crystal device comprising the optical according to claim 9.

12. The liquid crystal device according to claim 10, wherein the liquid crystal device is a transflective liquid crystal device operable to provide both a transmissive display and a reflective display in a single pixel, and the optical element is provided as a reflective layer for the reflective display.

13. The liquid crystal device according to claim 11, wherein the liquid crystal device is a transflective liquid crystal device capable of providing both a transmissive display and a reflective display in a single pixel, and the optical element is provided as a reflective layer for the reflective display.

14. An electronic apparatus comprising the liquid crystal device according to claim 8.

15. An electronic apparatus comprising the liquid crystal device according to claim 9.

16. An optical element, comprising:
    a substrate including a plurality of first regions and a plurality of second regions that are partitioned in plan view;
    a first grid one-dimensionally formed in the plurality of first regions on the substrate;
    a diffraction function portion disposed in one of the plurality of second regions, the diffraction function portion including a plurality of grooves parallel to each other and a plurality of protruded threads, the plurality of grooves being formed in the one of the plurality of second regions on the substrate and not being formed in the plurality of first regions on the substrate; and
    a second grid formed in a region on the plurality of protruded threads excluding the plurality of grooves,
    wherein the first and second grids each reflect a part of incident light and transmit a part of the incident light,
    the second grid and the plurality of protruded threads are formed of different materials,
    the first and second grids each have a polarization-separation function, and
    a height of the diffraction function portion is set such that diffusion of the transmitted light is weaker than diffusion of the reflected light.

* * * * *